US008631399B2

(12) United States Patent
Endo et al.

(10) Patent No.: US 8,631,399 B2
(45) Date of Patent: Jan. 14, 2014

(54) INFORMATION PROCESSING APPARATUS AND FIRMWARE UPDATING METHOD

(75) Inventors: Go Endo, Kawasaki (JP); Hajime Shirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 12/903,278

(22) Filed: Oct. 13, 2010

(65) Prior Publication Data

US 2011/0093843 A1  Apr. 21, 2011

(30) Foreign Application Priority Data

Oct. 16, 2009 (JP) .................................. 2009-239100

(51) Int. Cl.
G06F 9/445 (2006.01)
G06F 9/44 (2006.01)

(52) U.S. Cl.
USPC ........... 717/174; 717/177; 717/178; 717/168; 717/173

(58) Field of Classification Search
USPC ..................... 717/174, 177, 178, 168, 173
See application file for complete search history.

(56) References Cited

U.S. PATENT DOCUMENTS 7,704,147 B2 * 4/2010 Quraishi et al. ............... 717/178
2010/0325622 A1 * 12/2010 Morton .......................... 717/168

FOREIGN PATENT DOCUMENTS

| JP | 1-234954 A | 9/1989 |
| JP | 5-127891 A | 5/1993 |
| JP | 10-171633 A | 6/1998 |
| JP | 2008-225763 A | 9/2008 |

* cited by examiner

Primary Examiner — Qamrun Nahar
(74) Attorney, Agent, or Firm — Fujitsu Patent Center

(57) ABSTRACT

An apparatus includes a first processor including a first storage having a first and a second area, a download-instructor issuing a download-instruction downloading a second firmware from the second area of the first storage at power-off, and a first-launcher switching the second area of the first storage from standby-system to working-system and launching a first firmware at power-on, and a second processor including a second storage having a first area as a working-system and a second area as a standby-system, a downloader downloading the second firmware stored in the second area of the first storage as the first storage standby-system into the second area of the second storage as the second storage standby-system when the downloading-instruction is received, and a second-launcher switching the second area of the second storage from the standby-system to the working-system and launching the second firmware in the second area of the second storage at power-on.

16 Claims, 28 Drawing Sheets

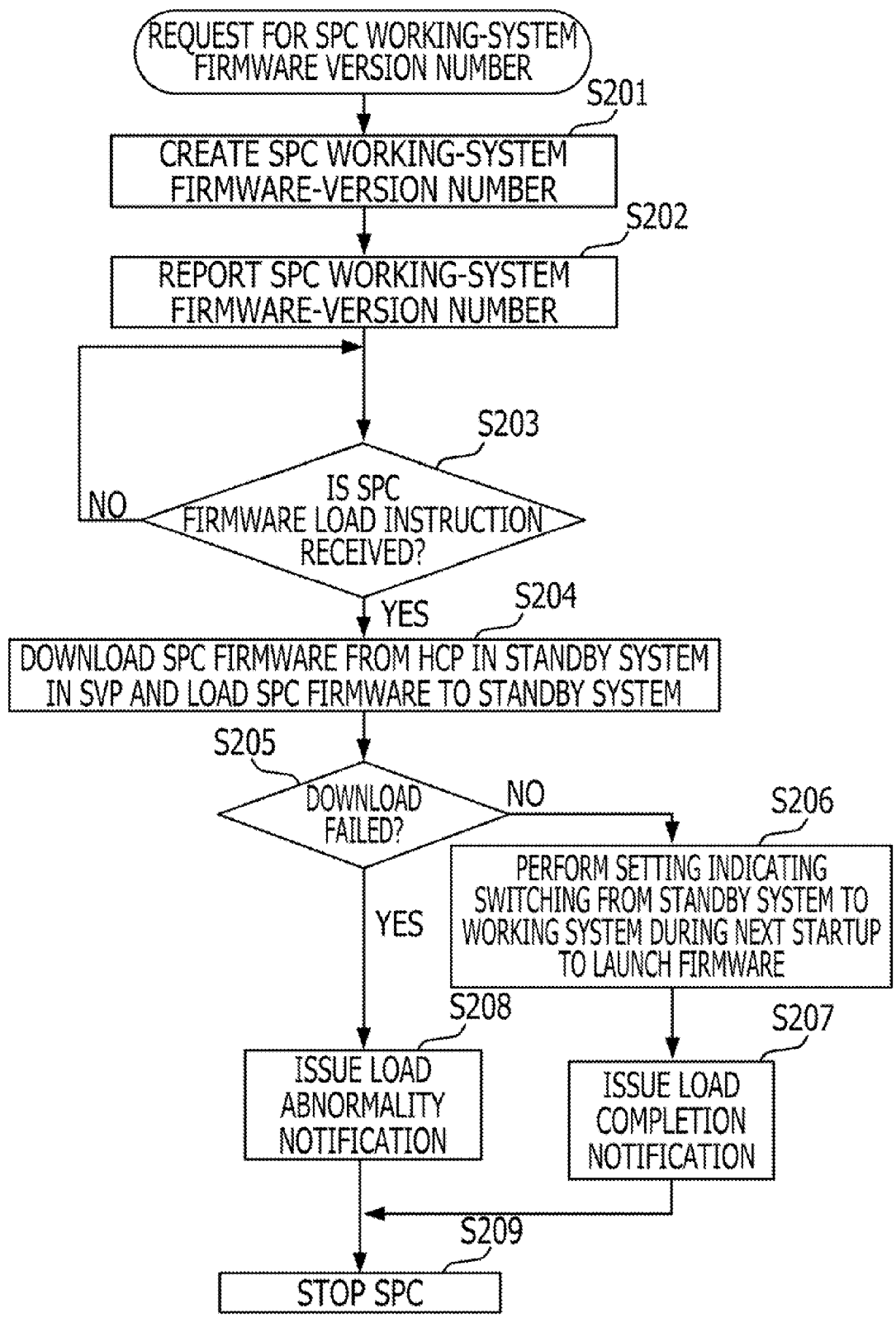

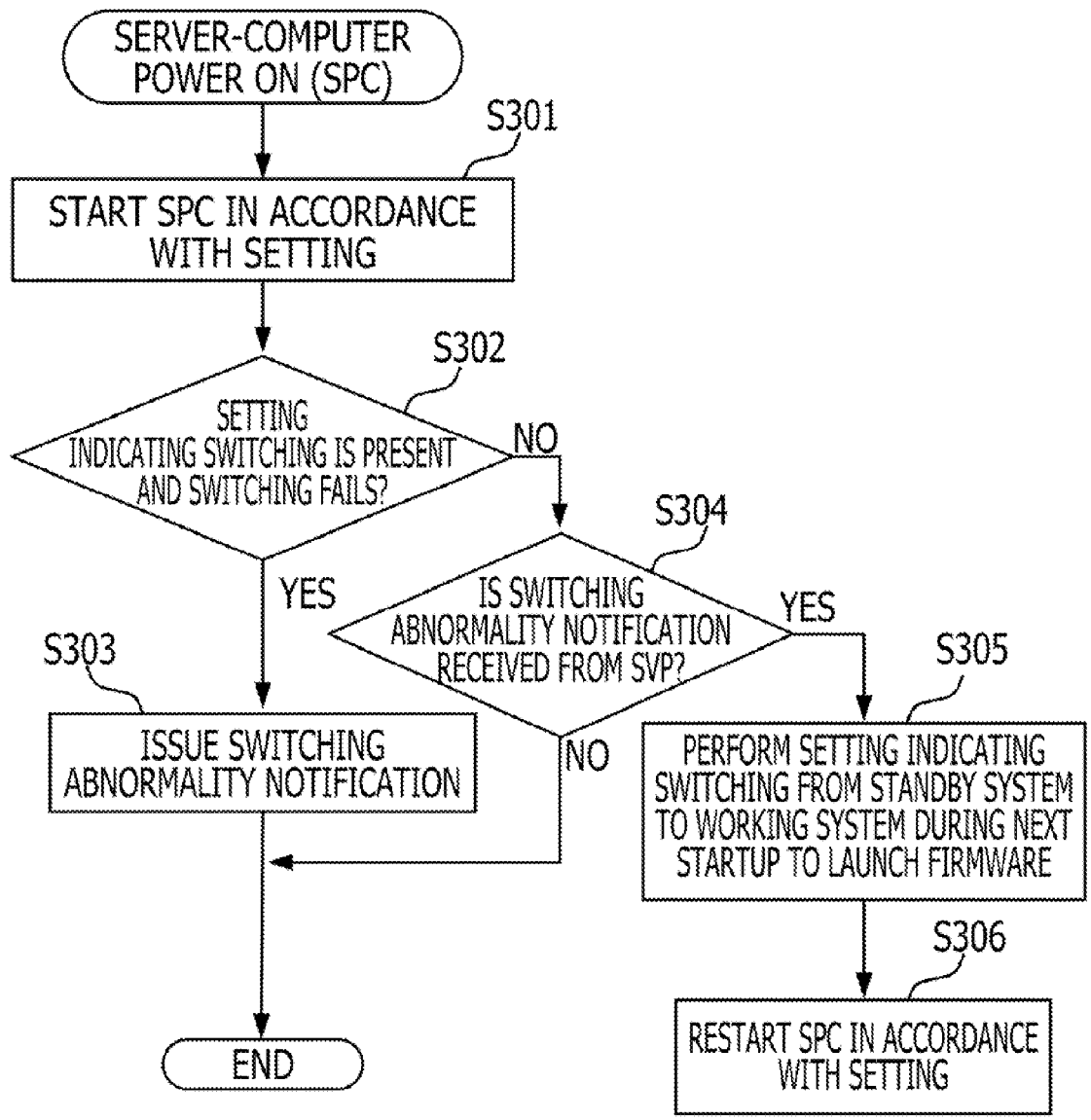

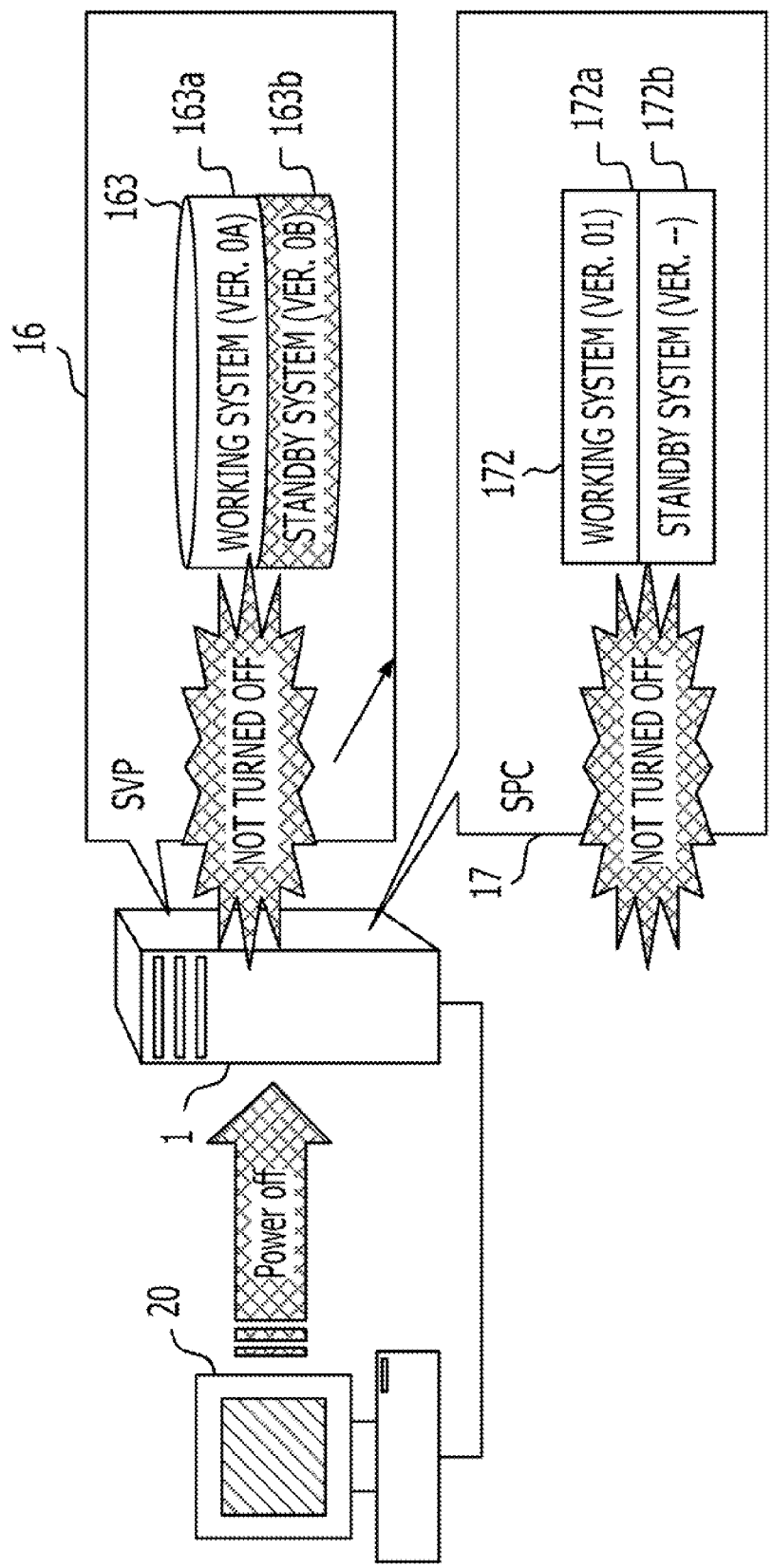

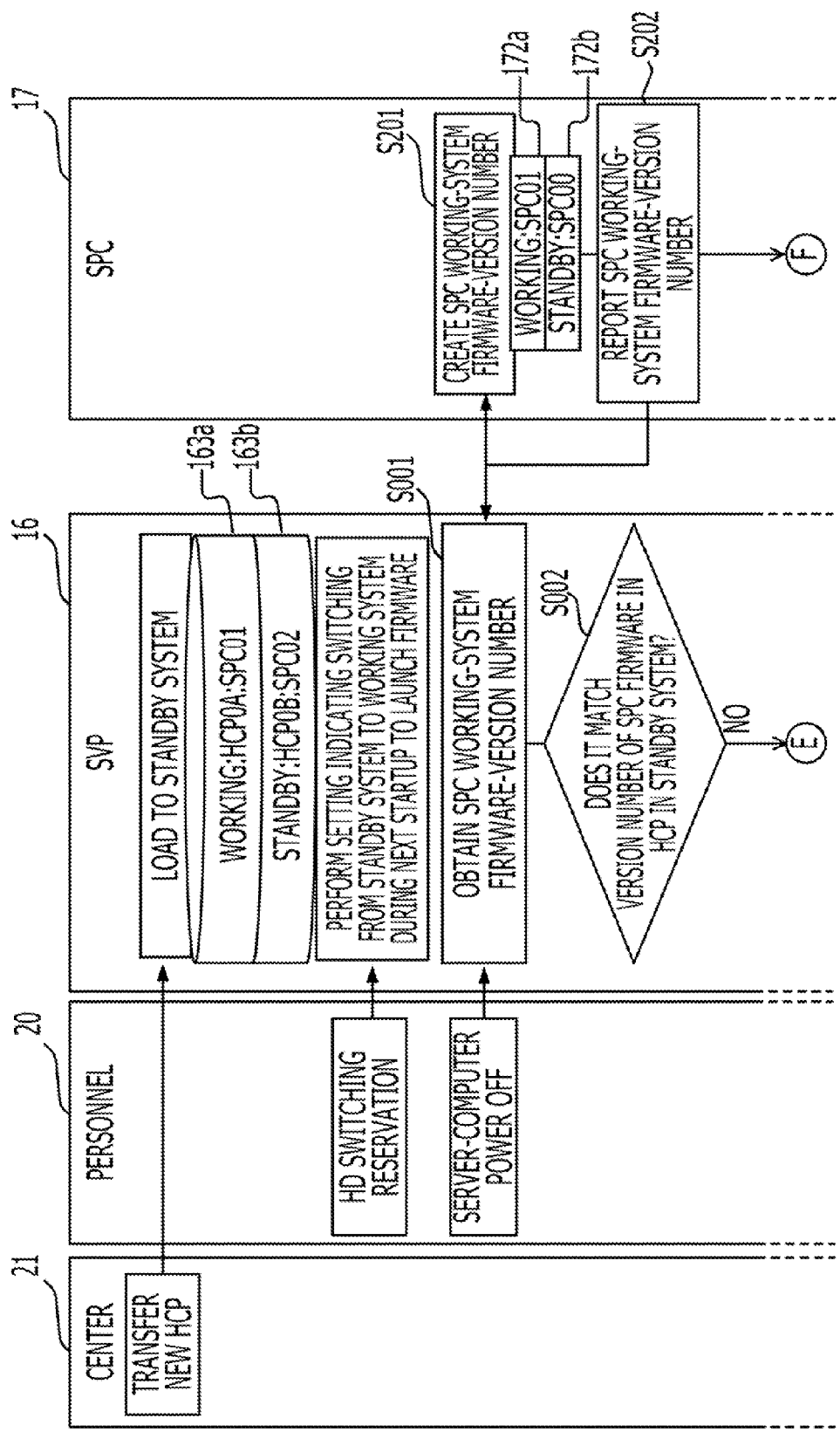

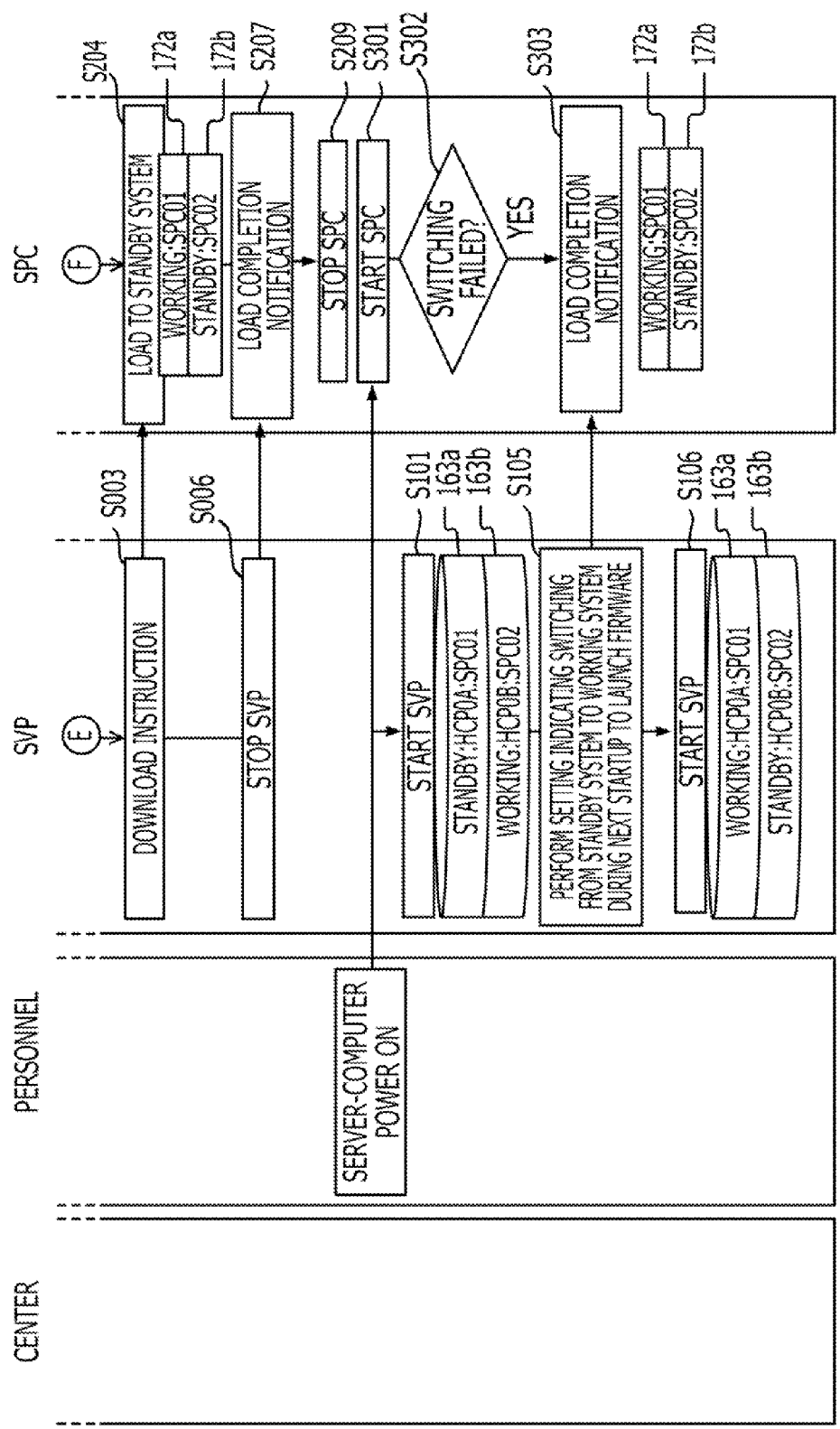

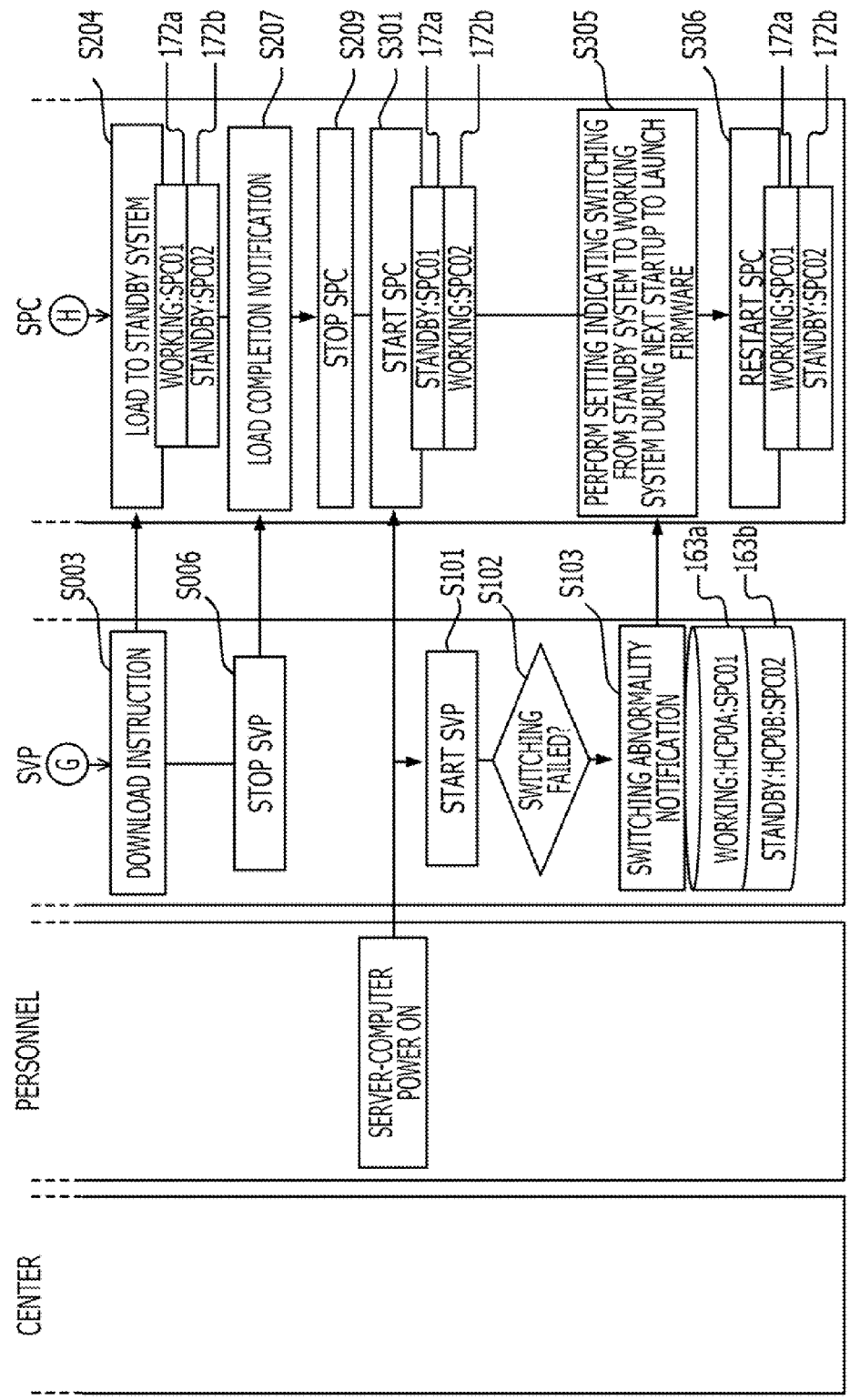

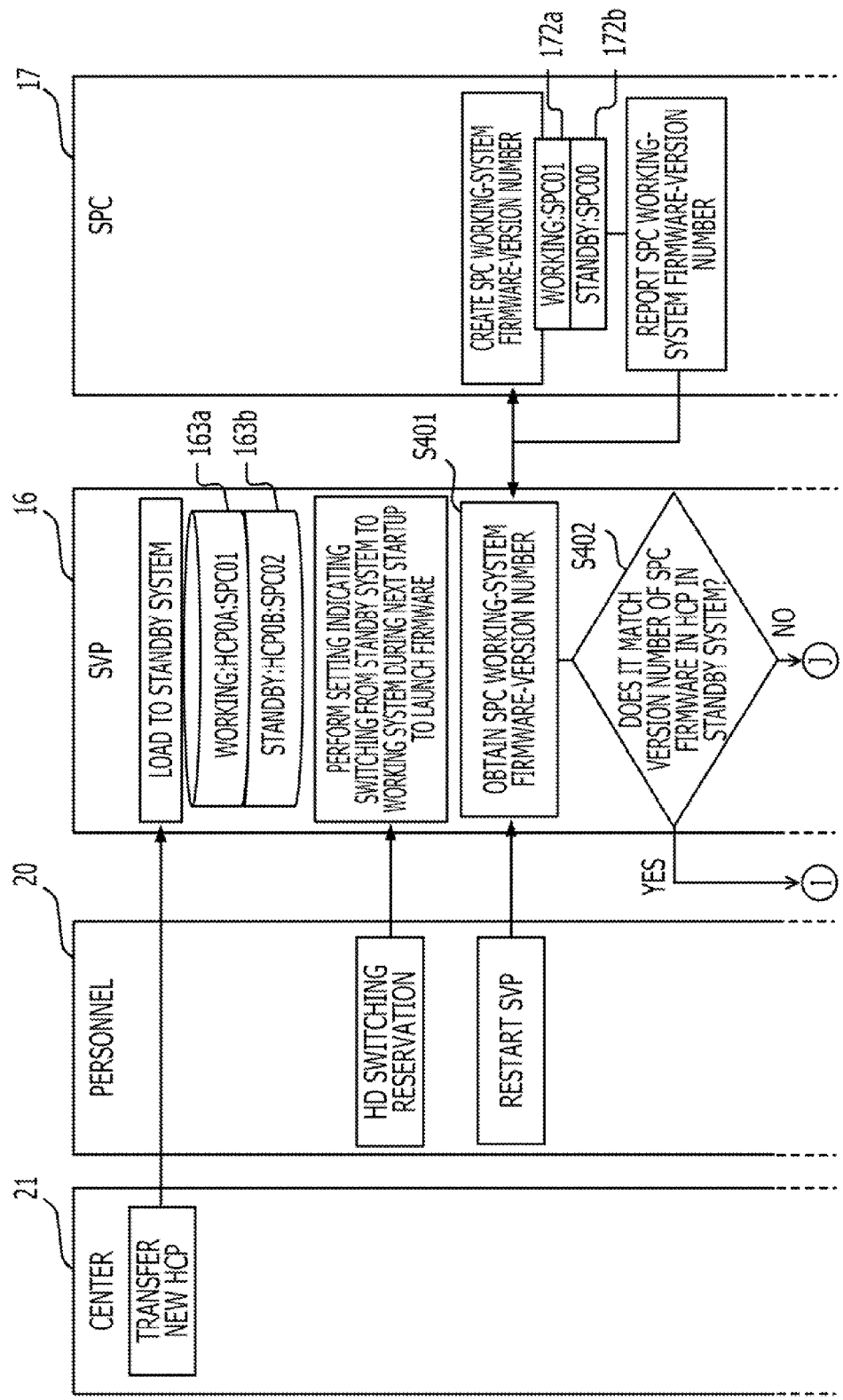

INFORMATION PROCESSING APPARATUS AND FIRMWARE UPDATING METHOD

CROSS-REFERENCE TO RELATED APPLICATION

This application is based upon and claims priority to prior Japanese Patent Application No. 2009-239100 filed on Oct. 16, 2009 in the Japan Patent Office, the entire contents of which are incorporated herein by reference.

FIELD

The present invention relates to an information processing apparatus and a firmware updating method.

BACKGROUND

Information processing apparatuses, such as mission-critical servers, employ a configuration which includes an SVP (SerVice Processor) and an SPC (System Power Controller). The SVP, which is provided independently from hardware of a main processor for executing tasks, performs maintenance and operation of the information processing apparatuses. The SPC controls a power-supply device of the information processing apparatus.

The SVP and the SPC are on-board computers that have corresponding processors (hereinafter referred to as CPUs (Central Processing Units)). In addition to the CPU for executing the aforementioned processing, each of the SVP and the SPC has a storage medium such as a hard disk or a memory for storing firmware. A firmware is a kind of a program containing a series of instructions used for performing the maintenance and the operation of the information processing apparatuses and executed by the corresponding CPU.

Since such mission-critical servers need to operate stably. Accordingly, each of the storage medium for the SVP and the storage medium for the SPC is duplicated. That is, the firmware is installed in each of the duplicated storage media, and one of the storage media is used as a storage medium in a working system and the other storage medium is used as a storage medium in a standby system. When a failure occurs in the storage medium in the working system, that storage medium is switched to the standby system and the storage medium that was previously set as the standby system is switched to the working system. Maintenance is then performed on the storage medium in the standby system (i.e., the storage medium in which the failure occurred).

An upgraded version of the firmware for the SVP and an upgraded version of the firmware for the SPC are supplied, with both of the firmware being contained in one package such as a folder or archive, from a management center with which a computing system can communicate over a network. Such a firmware package will hereinafter be referred to as an HCP (Hardware Control Program).

An update procedure for the SVP and the SPC when a new version of the HCP is supplied will now be described with reference to flow diagrams illustrated in FIGS. 20A and 20B.

As illustrated in FIGS. 20A and 20B, since the storage medium in the working system is operating in the SVP, the new version of the HCP is downloaded from the management center to the storage medium in the standby system. A new version of firmware for the SVP being included in the HCP is installed to the storage medium in the standby system. Maintenance personnel may then perform a setting on a next-time startup version-number area, which is included in a header section in the storage medium (e.g., a hard disk) in the SVP. The setting indicates that during the next startup, the storage medium on which the new version of the firmware is installed is switched from the standby system to the working system. That is, the maintenance personnel perform a setting so that the CPU in the SVP launches the firmware in the storage medium set as the storage medium in the standby system when the power of a server apparatus is turned off and the power is then turned on again. Thereafter, when the power of the server apparatus is turned off, the CPU in the SVP confirms that the version number of the SPC firmware included in the HCP stored in the working-system storage medium in the SVP matches the version number of the firmware installed on the working-system storage medium in the SPC. Thereafter, the CPU in the SVP finishes the entire processing.

Next, when the maintenance personnel turn on the power of the server apparatus, the CPU in the SVP included therein sets the storage medium set as the standby system before the power was turned off as the working-system storage medium to launch the new version of the SVP firmware on the storage medium in accordance with the setting for switching the storage medium during the next startup.

At this point in time, however, the new version of the SPC firmware is only the firmware included in the new version of the HCP stored in the (newly switched) working-system storage medium in the SVP, and is yet to be installed in either of the storage media in the SPC. Thus, the SVP needs to be started with the old version of the firmware to continue subsequent processing.

In order to update the firmware in the SPC, the power of the server apparatus needs to be turned off and the power is then turned on again. Thus, when the power of the server apparatus is turned off, the CPU in the SVP confirms that the version number of the SPC firmware included in the HCP stored in the working-system storage medium in the SVP does not match the version number of the firmware installed on the working-system storage medium in the SPC. That is, the CPU in the SVP confirms that the version number of the SPC firmware is older than the version number of the firmware in the working system in the SVP. The CPU in the SVP then instructs the SPC to download the new version of the SPC firmware included in the HCP stored in the working-system storage medium in the SVP. The CPU in the SPC then downloads the new version of the SPC firmware to the standby-system storage medium in the SPC and performs setting so that the storage medium is switched from the standby system to the working system during next startup.

Next, when the power of the server apparatus is turned on, the CPU in the SPC included in the server apparatus whose power is turned on handles the storage medium which is handled as the standby-system storage medium before the power was turned off as the working-system storage medium to read and launch the new version of the SVP firmware stored in the working-system storage medium. Upon the launch of the new version of the SVP firmware, the version number of the firmware launched by the SVP and the version number of the firmware launched by the SPC match each other. That is, the firmware in the working system in the SVP and the firmware in the working system in the SPC are updated to the versions of the firmware included in the same new version of the HCP.

FIGS. 21A and 21B illustrate a flow of an operation in which only the SVP is restarted (reset) rather than turning off and on the power of the entire server apparatus in order to switch between the working system and the standby system for the storage media in the SVP. The operation illustrated in FIGS. 21A and 21B are a variation of the operation illustrated in FIGS. 20A and 20B. When the SVP is restarted, the SVP confirms that the version number of the SPC firmware included in the HCP stored in the working-system storage medium in the SVP matches the version number of the firmware installed on the working-system storage medium in the SPC as illustrated in FIGS. 20A and 20B. Thereafter, the SVP restarts (resets) itself and handles the storage medium handled as the standby-system storage medium before the power was turned off, as the working-system storage medium to read and launches the new version of the SVP firmware in the working-system storage medium. Subsequently, through the same procedure as that illustrated in FIGS. 20A and 20B, the SPC firmware is updated to its new version.

[Patent Document 1] Japanese Laid-open Patent Publication No. 1-234954

[Patent Document 2] Japanese Laid-open Patent Publication No. 10-171633

[Patent Document 3] Japanese Laid-open Patent Publication No. 2008-225763

[Patent Document 4] Japanese Laid-open Patent Publication No. 5-127891

SUMMARY

According to an aspect of the invention, an apparatus includes a first processor including a first storage having a first and a second area, a download-instructor issuing a download-instruction downloading a second firmware from the second area of the first storage at power-off, and a first-launcher switching the second area of the first storage from standby-system to working-system and launching a first firmware at power-on, and a second processor including a second storage having a first area as a working-system and a second area as a standby-system, a downloader downloading the second firmware stored in the second area of the first storage as the first storage standby-system into the second area of the second storage as the second storage standby-system when the downloading-instruction is received, and a second-launcher switching the second area of the second storage from the standby-system to the working-system and launching the second firmware in the second area of the second storage at power-on.

BRIEF DESCRIPTION OF THE DRAWINGS

FIG. 4 is a flowchart illustrating processing for a firmware update program for an SPC during reception of an SPC working-system firmware version update request;

FIG. 5 is a flowchart illustrating processing for the firmware update program for the SPC during input of the server-computer-power-on command;

FIG. 13 is a schematic diagram illustrating the second operation example;

FIGS. 14A and 14B are a flow diagram illustrating a third operation example;

FIGS. 16A and 16B are a flow diagram illustrating a fourth operation example;

FIGS. 18A and 18B are a flow diagram illustrating a modification;

DESCRIPTION OF EMBODIMENTS

Embodiments will be described below with reference to the accompanying drawings.

<System Configuration>

Figure 1:
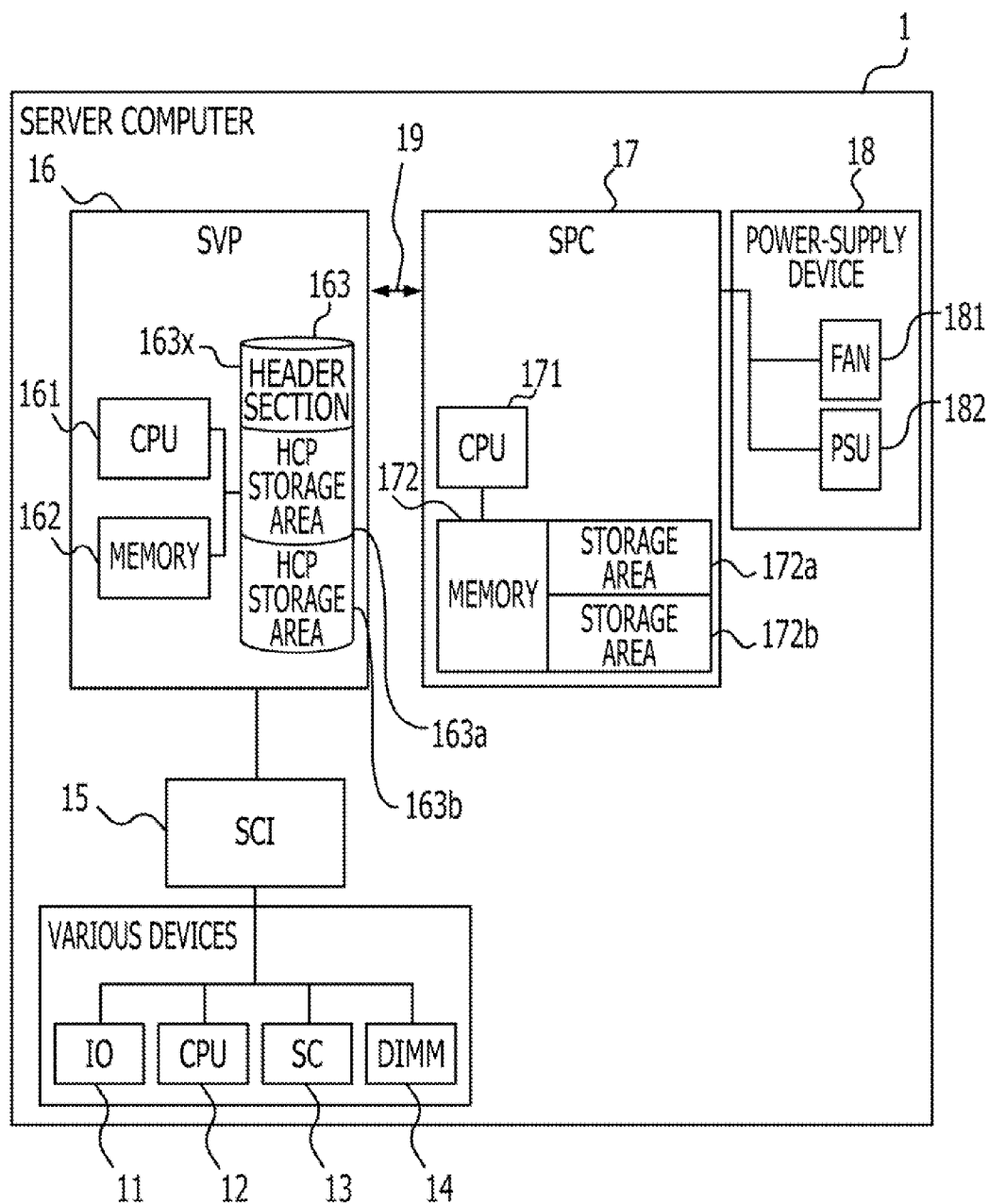
FIG. 1 is a block diagram of a hardware configuration of a server computer.

FIG. 1 is a block diagram schematically illustrating a hardware configuration of a server computer 1 disposed as an information processing apparatus according to an embodiment. As illustrated in FIG. 1, the server computer 1 includes various devices used for execution of intended operations of a server computer. Specifically, the server computer 1 includes an IO (Input/Output) 11, a CPU (Central Processing Unit) 12, an SC (System Controller) 13, and a DIMM (Dual Inline Memory Module) 14. The server computer 1 further includes an SCI (Serial Console Interface) 15, an SVP (Service Processor) 16, an SPC (System Power Controller) 17, and a power-supply device 18.

The SVP 16 is disposed as a server control device and executes processing for maintenance, management, and so on of the aforementioned devices 11 to 14. The SCI 15 is disposed as an interface between the SVP 16 and the devices 11 to 14 and also disposed as a hardware control device.

The power-supply device 18 supplies main power to the hardware 11 to 17 included in the server computer 1.

The SPC 17 can mutually communicate with the SVP 16 through a bus 19 and is disposed as a power-supply control device for controlling the power-supply device 18.

The SVP 16 is disposed as a first processor and is an on-board computer that operates independently from the CPU 12. The SVP 16 includes a CPU 161, a memory 162, and a hard disk 163, which are coupled with each other.

The hard disk 163 is a storage medium having a dual structure in which one disk is logically divided into three areas 163a, 163b, and 163x. An HCP (Hardware Control Program) storage area 163a, an HCP storage area 163b, and a header section 163x in which entire-HCP version number information, a physical volume label, and duplicated control information are stored are assigned to the areas 163a, 163b, and 163x, respectively. On the basis of setting performed by the CPU 161 on the header section 163x, a BIOS (Basic Input Output System) sets the HCP storage area 163a as a working system and sets the HCP storage area 163b as a standby system, for example. In other words, the CPU 161 handles the HCP storage area 163a as a working system for reading firmware and handles the other HCP storage area 163b as a standby system. In principle, pieces of firmware that have the similar configuration are installed on the HCP storage areas 163a and 163b. The firmware is read from the HCP storage area 163a set as the working system and is loaded into a volatile area of the memory 162 and the firmware loaded into the volatile area of the memory 162 is launched by the CPU 161. A firmware update program for executing processing for updating the firmware is installed in a non-volatile area of the memory 162.

The SPC 17 is disposed as a second processor and is an on-board computer that operates independently from the CPU 12 and the SVP 16. The SPC 17 includes a CPU 171 and a memory 172 which are coupled with each other. The memory 172 is disposed as a non-volatile memory medium having a dual structure constituted by two storage areas 172a and 172b that are independent from each other. On the basis of a setting for a non-volatile memory (not illustrated) included in the CPU 171, the BIOS sets the storage area 172a in the memory 172 as a working system and sets the storage area 172b as a standby system, for example. In other words, the storage area 172a in the memory 172 is handled as a working-system storage area from which the CPU 171 reads firmware and the storage area 172b is handled as a storage area in the standby system. The firmware installed in the storage area 172a set as the working system is read and executed by the CPU 171. A firmware update program for executing processing for updating the firmware is also installed in the memory 172.

The power-supply device 18 includes a PSU (power supply unit) 182 and a fan (cooling device) 181. The PSU 182 is disposed as a device for supplying main power to the individual devices included in the server computer 1. The PSU 182 is started by the SPC 17. Thus, minimum power needed to maintain a function for the SPC 17 to issue a start instruction to the PSU 182 is constantly supplied to the SPC 17 independently from the main power.

Figure 7:
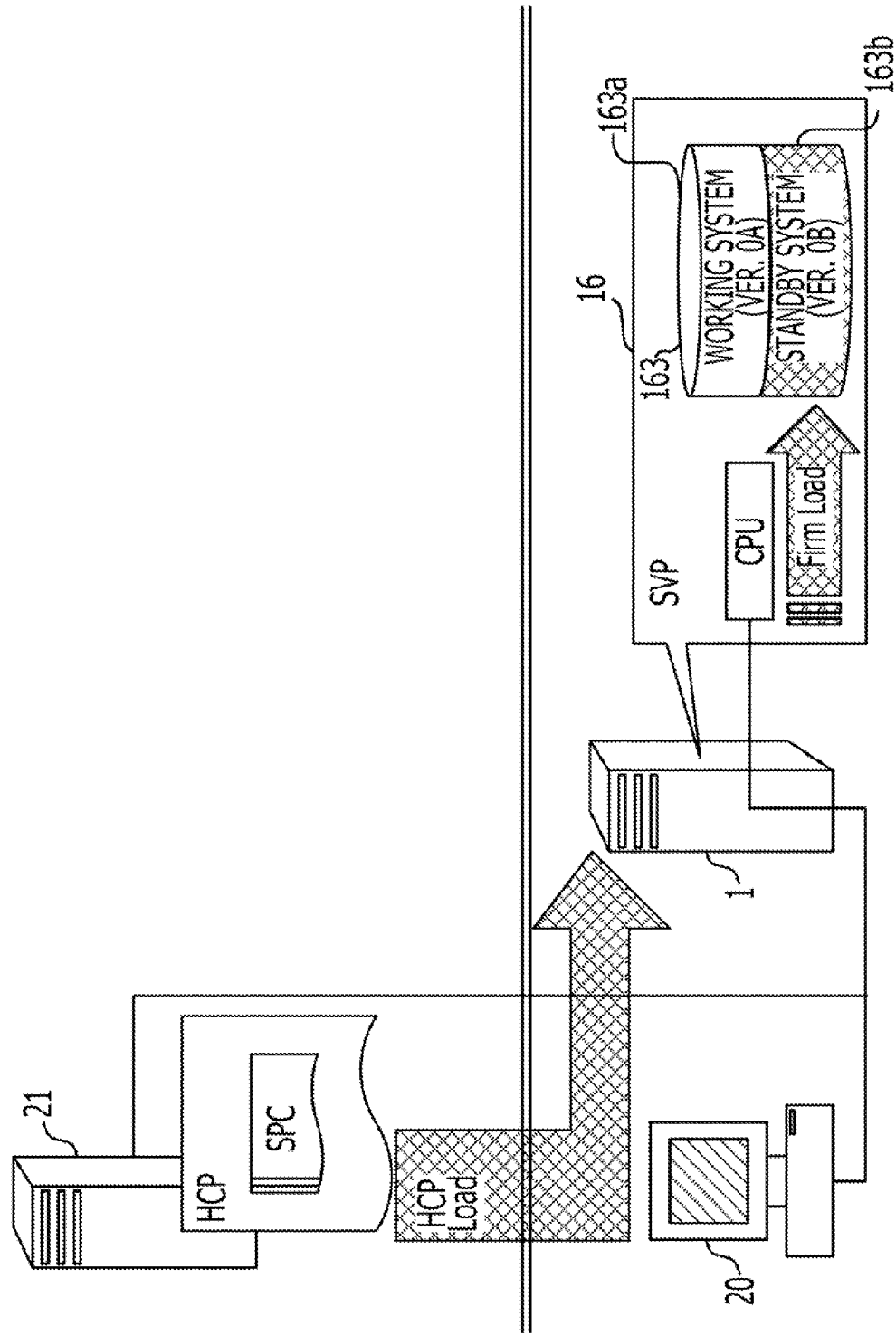
FIG. 7 is a schematic diagram illustrating the first operation example.

As illustrated in FIG. 7, the SVP 16 is coupled to a console 20 and receives various commands input by maintenance personnel via an input device (not illustrated) for the console 20. The SVP 16 is coupled to a management center 21. When a latest version of an HCP is released by the management center 21, the SVP 16 can download the HCP.

<Update Program>

Details of processing performed by the CPUs 161 and 171 on the basis of the firmware update program for the SVP 16 and the firmware update program for the SPC 17 will be described below with reference to flowcharts in FIGS. 2 to 5. For convenience of description below, with respect to the HCP storage areas on the hard disk 163, the HCP storage area set as the working system by default is denoted by reference character 163a and the HCP storage area set as the standby system by default is denoted by reference character 163b. Similarly, with respect to the storage areas in the memory 172, the storage area set as the working system by default is denoted by reference character 172a and the storage area set as the standby system by default is denoted by reference character 172b.

[SVP]

1. Download Processing

When a latest version of an HCP is uploaded on the management center 21, the CPU 161 automatically downloads the latest version of the HCP, which includes a version of the firmware for the SVP and a version of the firmware for the SPC to the HCP storage area 163b set as the standby system. The CPU 161 also installs the upgraded version of the SVP firmware included in the HCP to the HCP storage area 163b.

2. Switching Reservation Processing

When the maintenance personnel input a switching reservation command from the input device (not illustrated) for the console 20, the CPU 161 performs setting described below on a next-time startup version-number area in the header section 163x on the hard disk 163. That is, the CPU 161 performs a setting so that the HCP storage area 163b currently set as the standby system is switched to the working system and the HCP storage area 163a currently set as the working system is switched to the standby system during next startup and the firmware in the HCP storage area 163b newly switched to the working system is launched.

3. When Power is OFF

Figure 2:
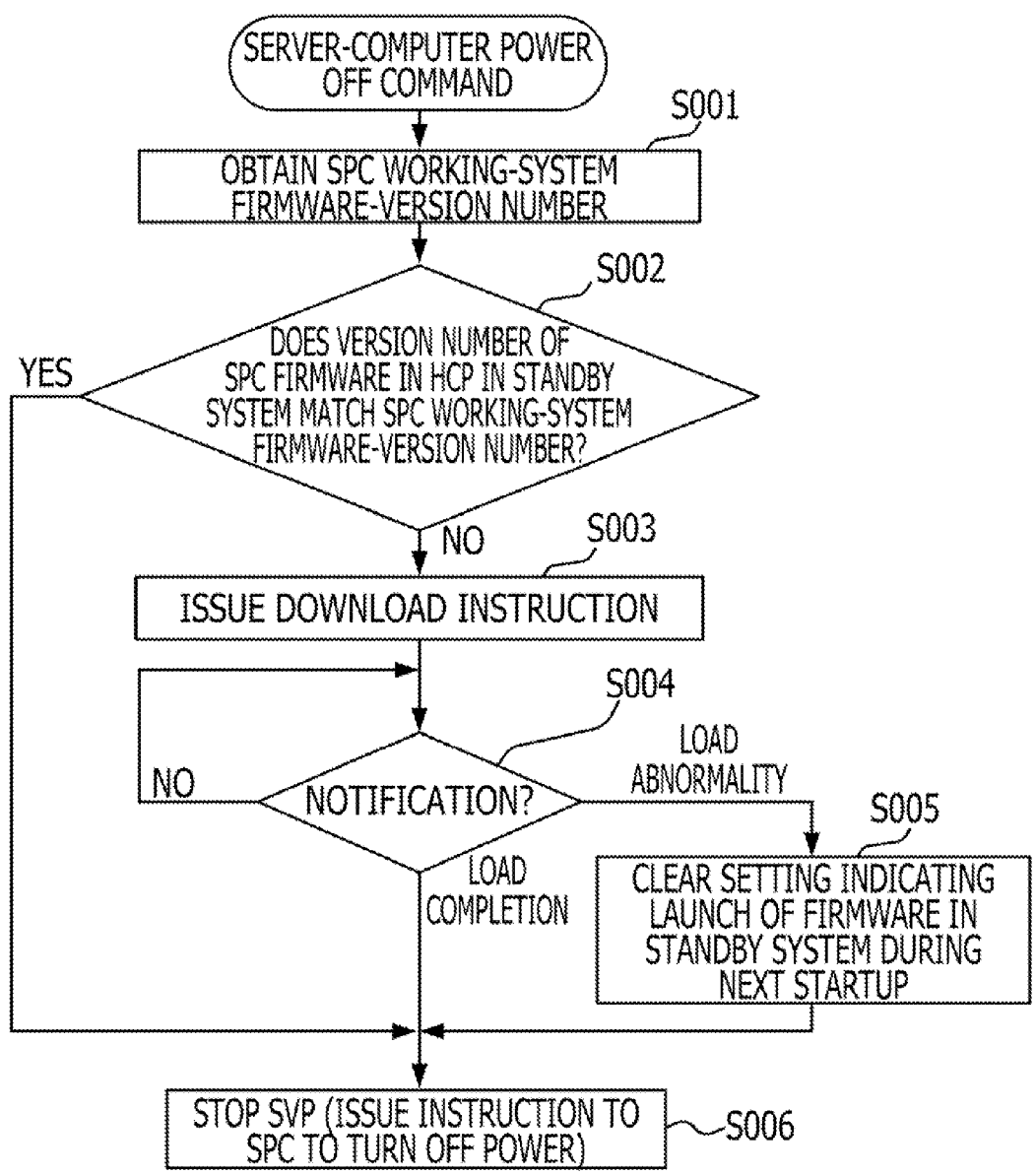
FIG. 2 is a flowchart illustrating processing for a firmware update program for an SVP during input of a server-computer-power-off command.
Figure 3:
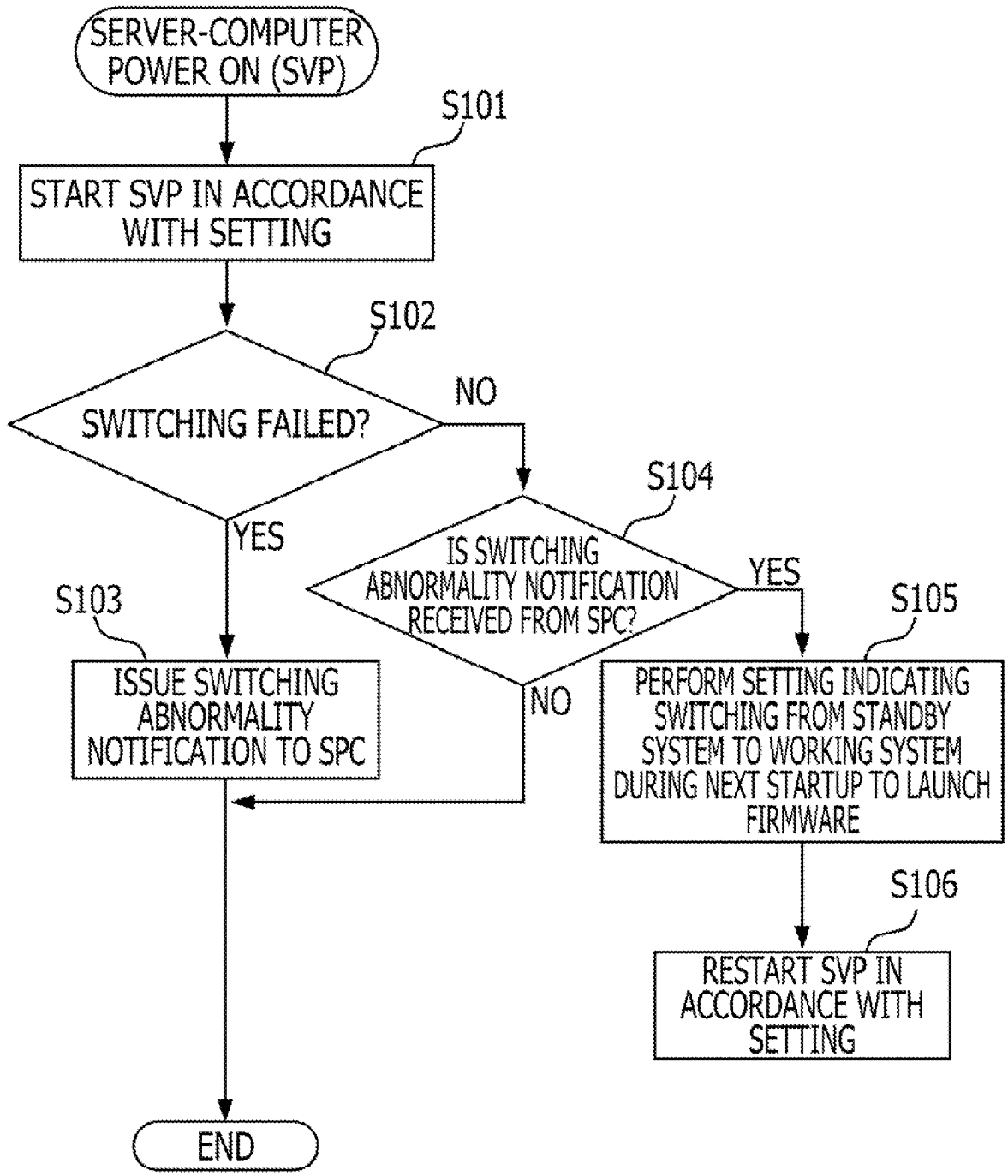
FIG. 3 is a flowchart illustrating processing for the firmware update program for the SVP during input of a server-computer-power-on command.

When the maintenance personnel input a command to turn off the power of the server computer 1, the CPU 161 that has read the firmware update program receives a power-off command from the input device (not illustrated) for the console 20 and starts processing illustrated in FIG. 2.

At first, in step S001, the CPU 161 queries the SPC 17 about a working-system firmware-version number (i.e., the version number of firmware installed in the storage area 172a currently set as the working system) after the processing is started. When the SPC 17 reports the working-system firmware-version number in response to the query about the working-system firmware-version number, the CPU 161 advances the process to step S002.

In step S002, the CPU 161 compares the version number of the SPC firmware included in the HCP stored in the HCP storage area 163b currently set as the standby system with the working-system firmware-version number obtained in step S001. The CPU 161 checks whether the version number of the SPC firmware and the working-system firmware-version number match each other.

When the version number of the SPC firmware and the working-system firmware-version number match each other, this means that the new version of the firmware is already downloaded to the SPC 17. In this case, the CPU 161 advances the process to step S006. When the version number of the SPC firmware and the working-system firmware-version number do not match each other, this means that an old version of the firmware exists in the SPC 17. In this case, the CPU 161 advances the process to step S003.

In step S003, the CPU 161 issues to the SPC 17 an instruction for downloading the SPC firmware (the CPU 161 corresponds to a download instructing unit). The "download instruction" refers to an instruction for downloading the SPC firmware, included in the HCP stored in the HCP storage area 163b set as the standby system at the time of current processing, to the standby-system storage area 172b in the SPC 17.

Next, in step S004, the CPU 161 waits until some type of notification (a load completion notification issued in step S207 described below or a load abnormality notification issued in step S208) is received from the SPC 17 that received the download instruction. Upon receiving the load completion notification, the CPU 161 advances the process to step S006.

On the other hand, upon receiving the load abnormality notification, the CPU 161 advances the process to step S005 in which it clears the setting performed in the above-described switching reservation processing. That is, the CPU 161 clears the setting indicating that the HCP storage area 163b currently set as the standby system and the HCP storage area 163a currently set as the working system are to be respectively switched to the working system and the standby system during next startup and the firmware in the HCP storage area 163b newly switched to the working system is to be launched. Upon completion of step S005, the CPU 161 advances the process to step S006.

In step S006, the CPU 161 issues, to the SPC 17, an instruction for turning off the supply of main power to the elements in the server computer 1. In response to the instruction for turning off the supply of the main power to the elements in the server computer 1, the SPC 17 controls the PSU 182 to stop the supply of the main power to the SVP 16, so that the operation of the SVP 16 stops.

4. When Power is ON

When the maintenance personnel input a command to turn on the power of the server computer 1, the SPC 17 receives a power-on command from the input device (not illustrated) for the console 20. In accordance with the received power-on command, the SPC 17 controls the power-supply device 18 so that main power is supplied from the PSU 182 to the SVP 16. The CPU 161 then reads the firmware update program and starts processing illustrated in FIG. 3.

At first, in step S101, the CPU 161 checks whether the setting for the switching reservation processing for the working-system/standby-system disks is present in the next-time startup version-number area in the header section 163x on the hard disk 163 after the start of the processing. That is, the CPU 161 checks the presence/absence of the setting indicating that the HCP storage area 163b currently set as the standby system and the HCP storage area 163a currently set as the working system are to be respectively switched to the working system and the standby system during next startup. The CPU 161 also checks whether the firmware in the HCP storage area 163b, newly switched to the working system, is to be launched. When the setting indicating that the HCP storage area 163b currently set as the standby system is to be switched to the working system to launch the firmware is present, the CPU 161 switches between the working system and the standby system in accordance with the setting to launch the firmware in the HCP storage area 163b newly switched to the working system (this operation of the CPU 161 corresponds to a function of a launching unit). When the setting described above is absent, the CPU 161 does not perform the switching between the working system and the standby system, and launches the firmware in the HCP storage area 163a set as the working system.

In step S102, the CPU 161 checks whether the switching of the HCP storage area 163b currently set as the standby system to the working system fails and the firmware in the HCP storage area 163a previously set as the working system is started even though the setting indicating the switching is present in the next-time startup firmware-version number area in the header section 163x on the hard disk 163. When the switching of the HCP storage area 163b currently set as the standby system to the working system fails, the process proceeds to step S103 in which the CPU 161 issues a switching-failure notification to the SPC 17. Thereafter, the processing ends.

On the other hand, when the result of the checking in step S101 indicates that the setting indicating that the HCP storage area 163b currently set as the standby system is to be switched to the working system to launch the firmware is absent or when the setting is present and the switching of the HCP storage area 163b succeeds, the process proceeds to step S104. In step S104, the CPU 161 checks whether a switching abnormality notification (step S303) is received from the SPC 17. When the switching abnormality notification is not received from the SPC 17, the CPU 161 ends the processing.

On the other hand, when the switching abnormality notification is received from the SPC 17, the process proceeds to step S105 in which the CPU 161 performs setting described below on the next-time startup version-number area in the header section 163x on the hard disk 163. That is, the CPU 161 performs setting so that the HCP storage area 163a currently set as the standby system and the HCP storage area 163b currently set as the working system are respectively switched to the working system and the standby system during next startup and the firmware in the HCP storage area 163a newly switched to the working system is launched.

Upon completion of step S105, the process proceeds to step S106 in which the CPU 161 resets itself in accordance with the setting indicating that the HCP storage area 163a currently set as the standby system is to be changed to the working system to launch the firmware. That is, the CPU 161 switches the HCP storage area 163a currently set as the standby system to the working system and switches the HCP storage area 163b currently set as the working system to the standby system to launch the firmware in the HCP storage area 163a newly switched to the working system in accordance with the setting. Consequently, the state before the power of the server computer 1 was turned on is restored.

[SPC]

1. For Reception of Request for SPC Working-System Firmware-Version Number

When the CPU 171 receives the request for the SPC working-system firmware-version number (step S001) is received from the SVP 16, the process proceeds to step S201 in which the CPU 171 reads the version number of the firmware installed in the storage area 172a in the current working system and creates a response statement (an SPC working-system firmware-version number).

In step S202, the CPU 171 transmits the response statement (the SPC working-system firmware-version number) created in step S201 to the SVP 16.

Next, in step S203, the CPU 171 waits until the SPC-firmware download instruction (step S003) is received from the SVP 16. Upon receiving the SPC-firmware load instruction (step S003) from the SVP 16, the CPU 171 advances the process to step S204.

In step S204, the CPU 171 downloads in the standby-system storage area 172b included in the memory 172 the SPC firmware included in the new version of the HCP stored in the standby-system HCP storage area 163b in the SVP 16 (this operation of the CPU 171 corresponds to a function of a downloading unit).

In step S205, the CPU 171 checks whether the firmware download performed in step S204 has failed. When the firmware download has failed, the process proceeds to step S208 in which the CPU 171 issues a load abnormality notification to the SVP 16. Subsequently, in step S209, the CPU 171 ends the processing.

On the other hand, when the firmware download has succeeded, the process proceeds to step S206 in which the CPU 171 performs a setting, described below, on the non-volatile memory in the CPU 171. That is, the CPU 171 performs a setting so that the storage area 172b currently set as the standby system and the storage area 172a currently set as the working system are respectively switched to the working system and the standby system during next startup and the firmware in the storage area 172b newly switched to the working system is launched. In step S207, the CPU 171 issues a load completion notification to the SVP 16. Subsequently, in step S209, the CPU 171 ends the processing.

2. When Power is ON

When the maintenance personnel input a command to turn on the power of the server computer 1, the CPU 171 receives a power-on command from the input device (not illustrated)

for the console 20. In step S301, the CPU 171 checks whether setting described below is present in the non-volatile memory in the CPU 171. That is, the CPU 171 checks the presence/absence of the setting indicating that the storage area 172b currently set as the standby system and the storage area 172a currently set as the working system are to be respectively switched to the working system and the standby system during next startup and the firmware in the storage area 172b newly switched to the working system is to be launched. When the setting indicating that the storage area 172b currently set as the standby system is to be switched to the working system to launch the firmware is present, the CPU 171 switches between the working system and the standby system in accordance with the setting to launch the firmware in the storage area 172b newly switched to the working system. When the setting indicating that the storage area 172b currently set as the standby system is to be switched to the working system to launch the firmware is absent, the CPU 171 launches the firmware in the storage area 172a currently set as the working system without switching between the working system and the standby system (this operation of the CPU 171 corresponds to a function of a launching unit).

In step S302, the CPU 171 checks whether the switching of the storage area 172b currently set as the standby system to the working system fails and the firmware in the storage area 172a previously set as the working system is started even though the setting indicating the switching is present in the non-volatile memory in the CPU 171. When the switching of the storage area 172b currently set as the standby system to the working system fails, the process proceeds to step S303 in which the CPU 171 issues a switching-abnormality notification to the SVP 16. Thereafter, the processing ends.

On the other hand, when the setting indicating that the storage area 172b currently set as the standby system is to be switched to the working system to launch the firmware is absent or when the setting is present and the switching succeeds, the process proceeds to step S304. In step S304, the CPU 171 checks whether a storage-area switching abnormality notification (step S103) is received from the SVP 16. When the switching abnormality notification is not received, the CPU 161 ends the processing.

On the other hand, when the switching abnormality notification is received, the process proceeds to step S305 in which the CPU 171 performs setting described below on the non-volatile memory disposed in the CPU 171. That is, the CPU 171 performs setting so that the storage area 172a currently set as the standby system and the storage area 172b currently set as the working system are respectively switched to the working system and the standby system during next startup and the firmware in the storage area 172a newly switched to the working system is launched.

Upon completion of step S305, the process proceeds to step S306 in which the CPU 171 resets itself in accordance with the setting indicating that the storage area 172a currently set as the standby system is to be switched to the working system to launch the firmware. That is, in accordance with the setting indicating that the storage area 172a currently set as the standby system is to be switched to the working system to launch the firmware, the CPU 171 switches the storage area 172a currently set as the standby system to the working system, the CPU 171 switches the storage area 172b currently set as the working system to the standby system, and the CPU 171 launches the firmware in the storage area 172a newly switched to the working system. Consequently, the state before the power of the server computer 1 was turned on is restored.

Figure 6A:
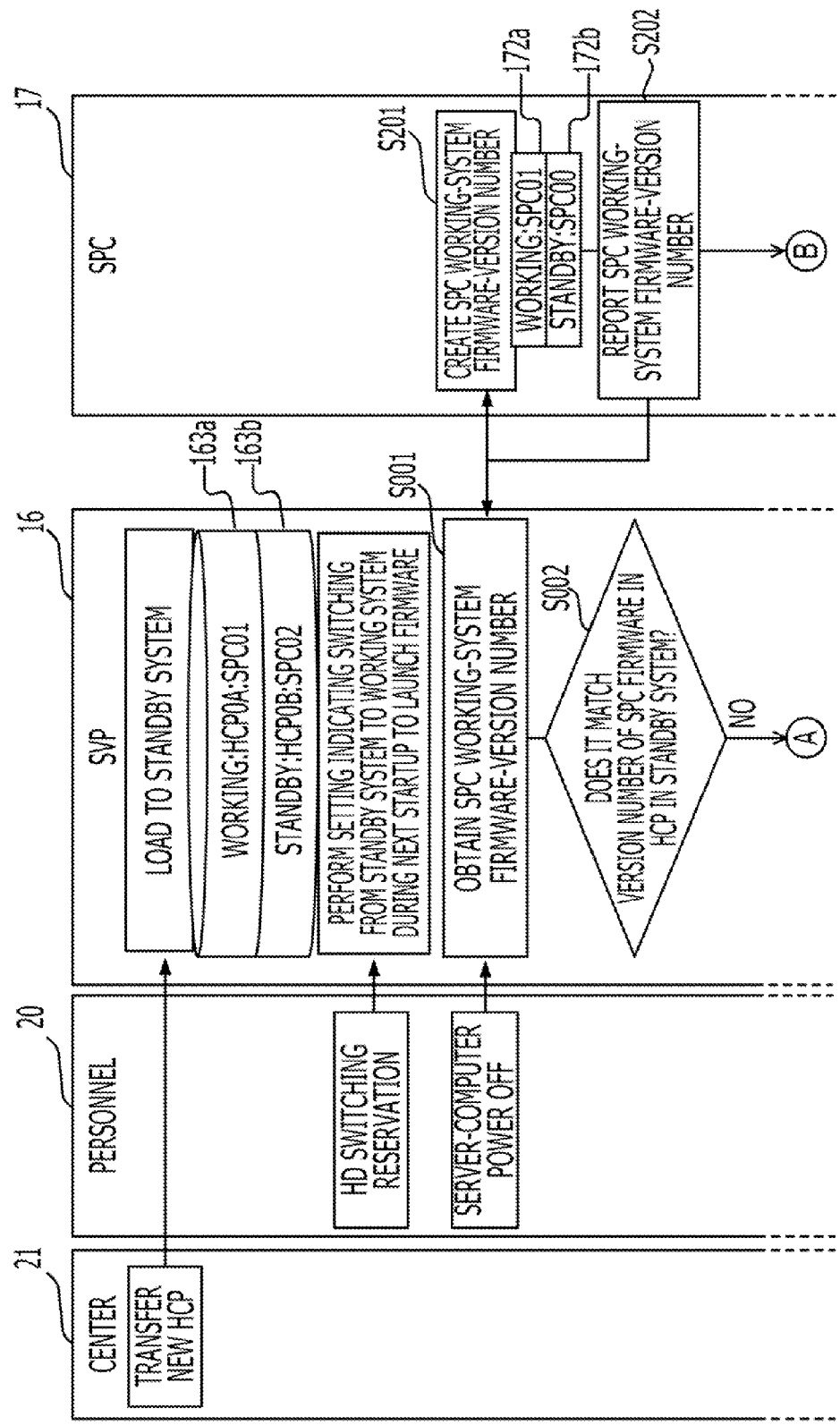
FIGS. 6A and 6B are a flow diagram illustrating a first operation example.
Figure 6B:
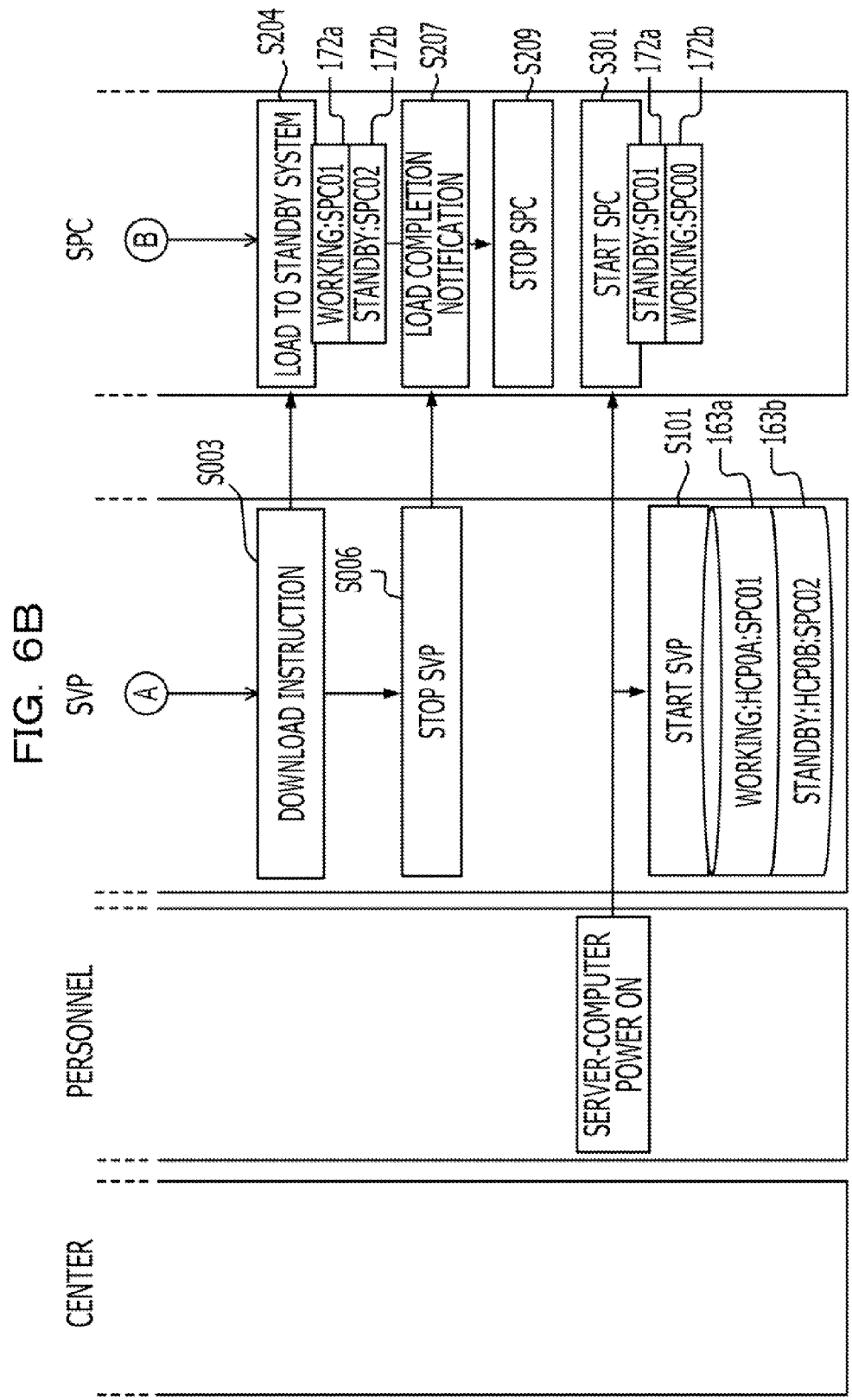

FIGS. 6A and 6B to 10 illustrate an example of a case in which the above-described firmware update has been performed without any error. FIGS. 6A and 6B illustrate highly relevant steps of the steps in the flowcharts illustrated in FIGS. 2 to 5.

Figure 8:
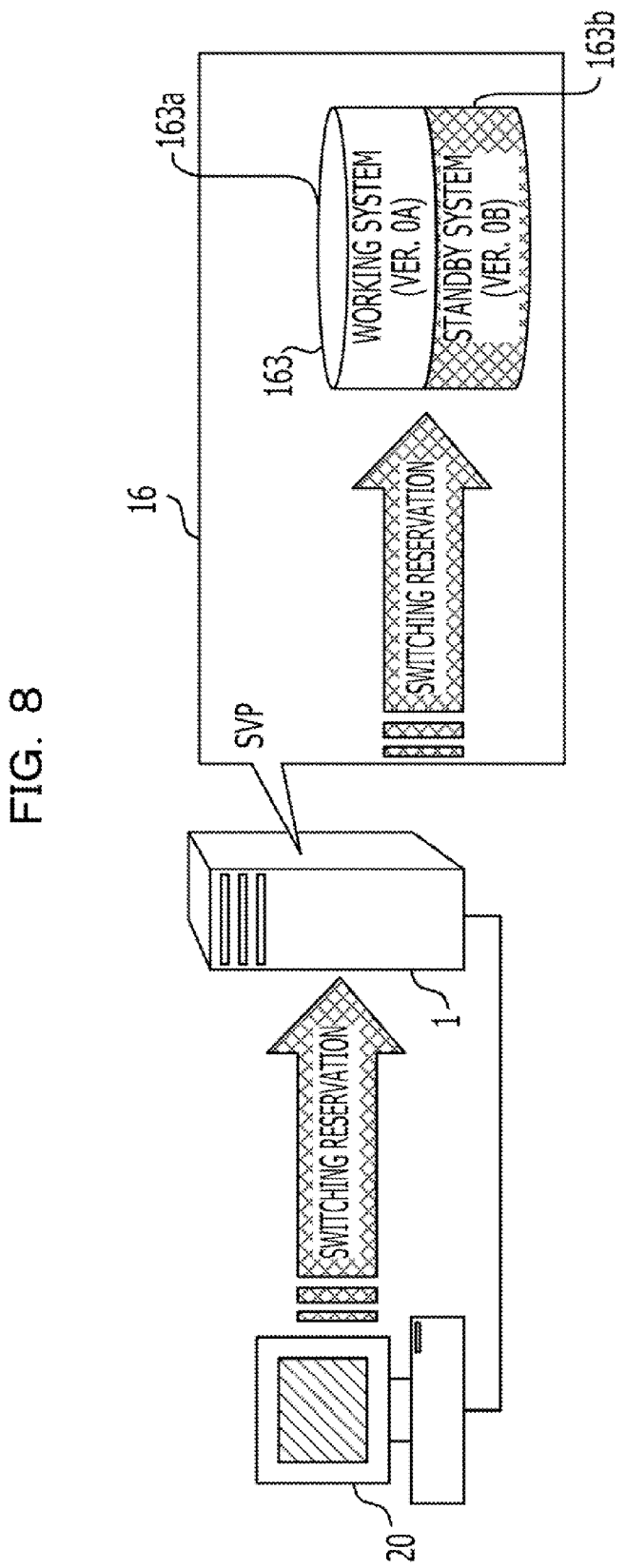
FIG. 8 is a schematic diagram illustrating the first operation example.

After the new version of an HCP is downloaded from the management center 21 to the SVP 16 as illustrated in FIG. 7, the maintenance personnel input a switching reservation command from the input device (not illustrated) for the console 20 as illustrated in FIG. 8. Upon input of the switching reservation command, the CPU 161 performs a setting, described below, on the next-time startup version-number area in the header section 163x on the hard disk 163. That is, the CPU 161 performs a setting so that the HCP storage area 163b currently set as the standby system and the HCP storage area 163a currently set as the working system are respectively switched to the working system and the standby system during next startup and the firmware in the HCP storage area 163b newly switched to the working system is launched.

Subsequently, when the maintenance personnel input a command to turn off the power of the server computer 1, the CPU 161 in the SVP 16 issues to the SPC 17 a request for reporting the working-system firmware-version number (step S001). The "working-system firmware-version number" as used in this case refers to the version number of the firmware installed in the storage area 172a set as the working system. When the CPU 171 in the SPC 17 receives the request for reporting the SPC working-system firmware-version number, the CPU 171 reads the version number of the firmware installed in the storage area 172a in the current working system and creates an SPC working-system firmware-version number (step S201). The CPU 171 also reports the created SPC working-system firmware-version number to the SVP 16 (step S202).

Figure 9:
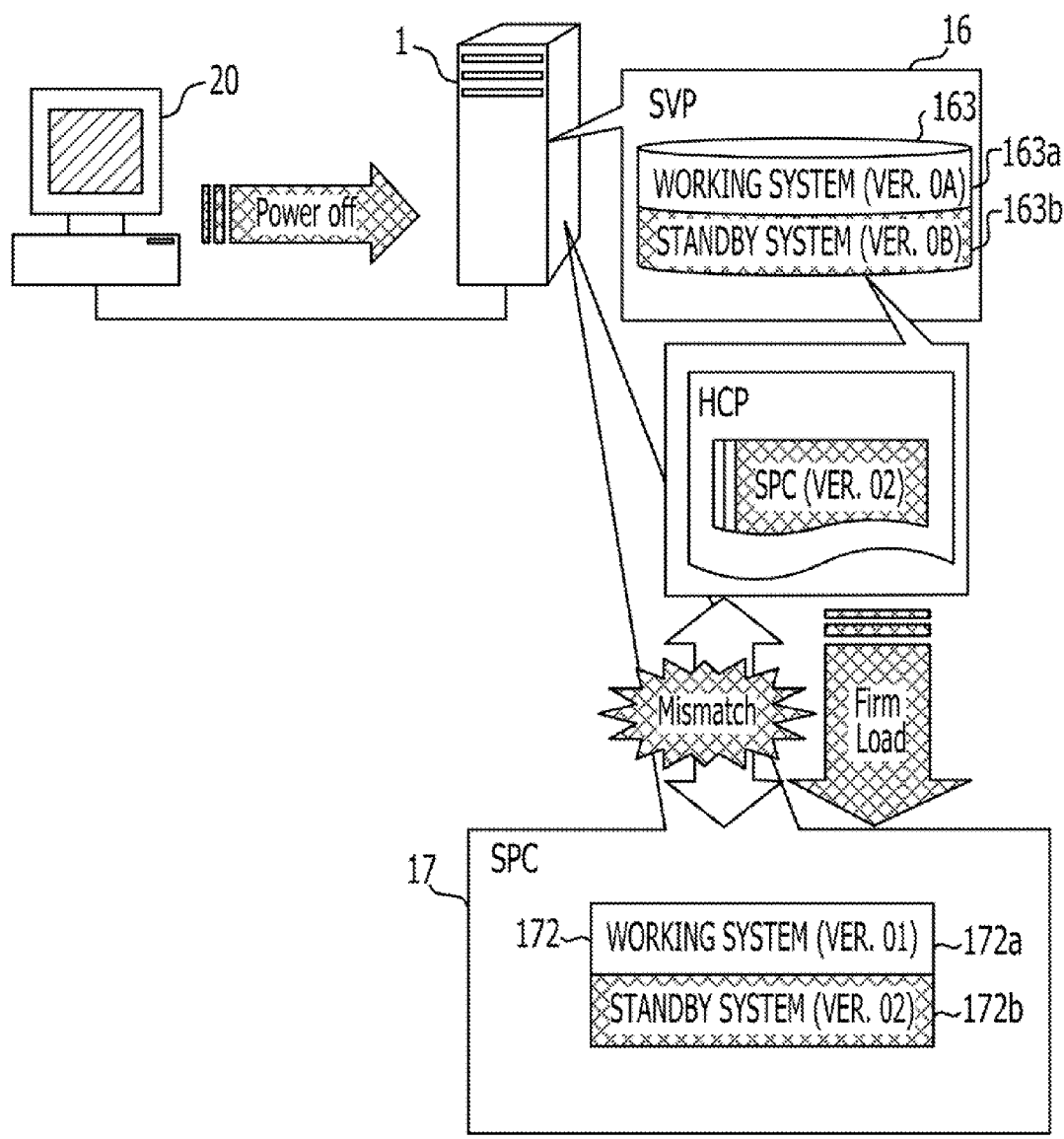
FIG. 9 is a schematic diagram illustrating the first operation example.

Upon receiving the SPC working-system firmware-version number, the CPU 161 in the SVP 16 confirms that the working-system firmware-version number does not match the version number of the SPC firmware included in the HCP stored in the HCP storage area 163b set as the standby system (step S002) as illustrated in FIG. 9. The CPU 161 then issues a download instruction to the SPC 17 (step S003). The CPU 171 in the SPC 17 receives the download instruction and downloads the SPC firmware in the new version of the HCP stored in the standby-system HCP storage area 163b in the SVP 16 to the standby-system storage area 172b in the memory 172 (step S204). When the download of the SPC firmware is completed, the CPU 171 issues a load completion notification to the SVP 16 (step S207). Subsequently, the CPU 171 in the SPC 17 controls the PSU 182 to turn off the main power, so that the SVP 16 and the SPC 17 are stopped.

Figure 10:
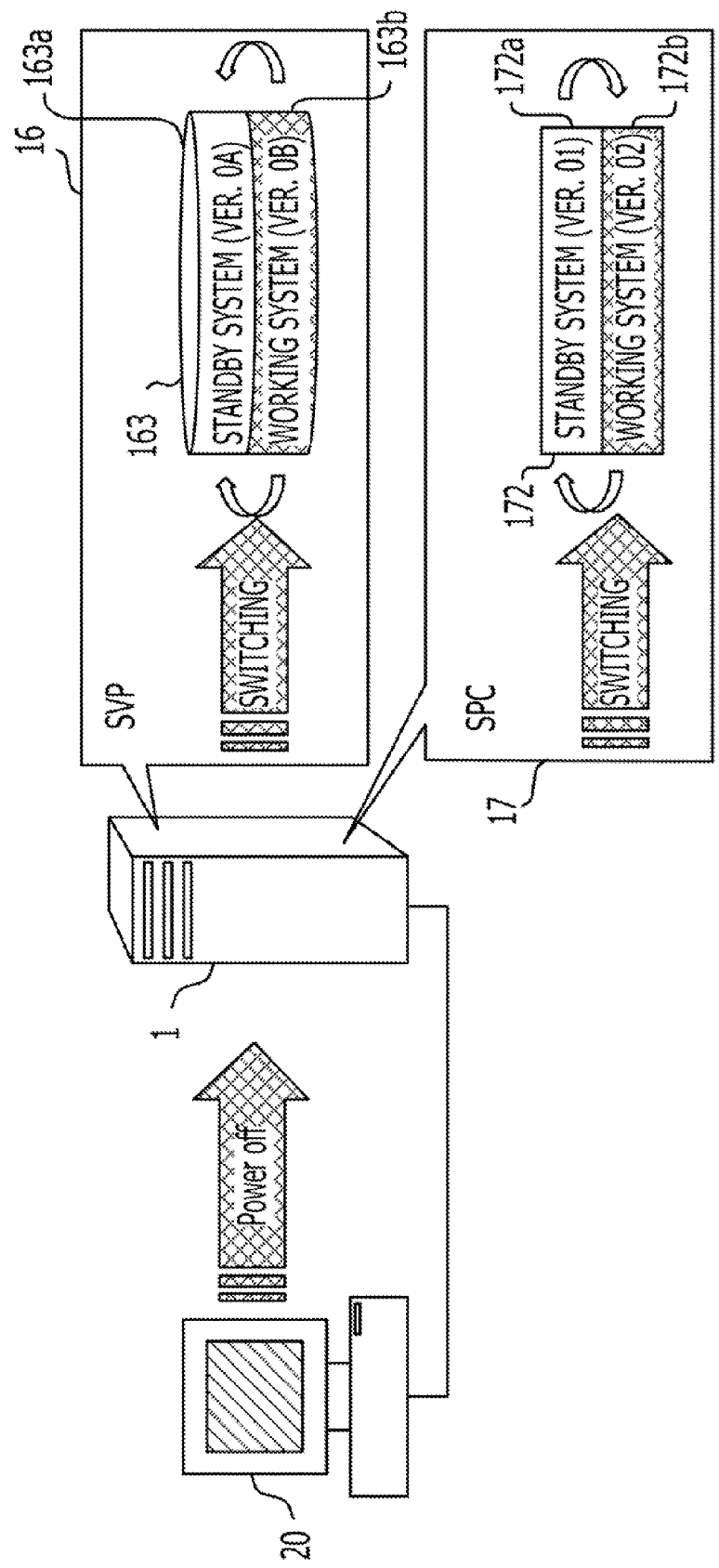
FIG. 10 is a schematic diagram illustrating the first operation example.
Figure 11A:
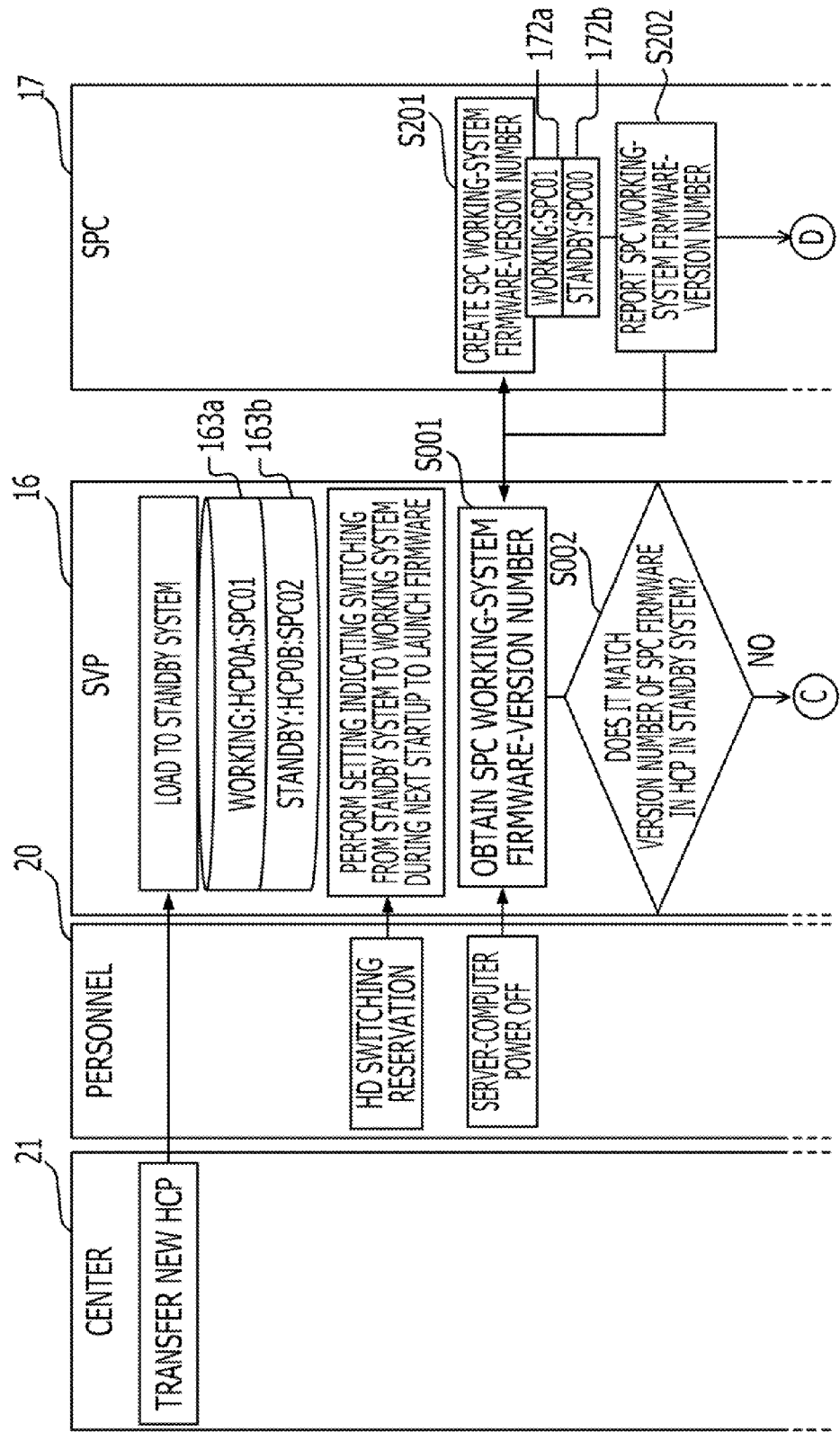
FIGS. 11A and 11B are a flow diagram illustrating a second operation example.
Figure 11B:
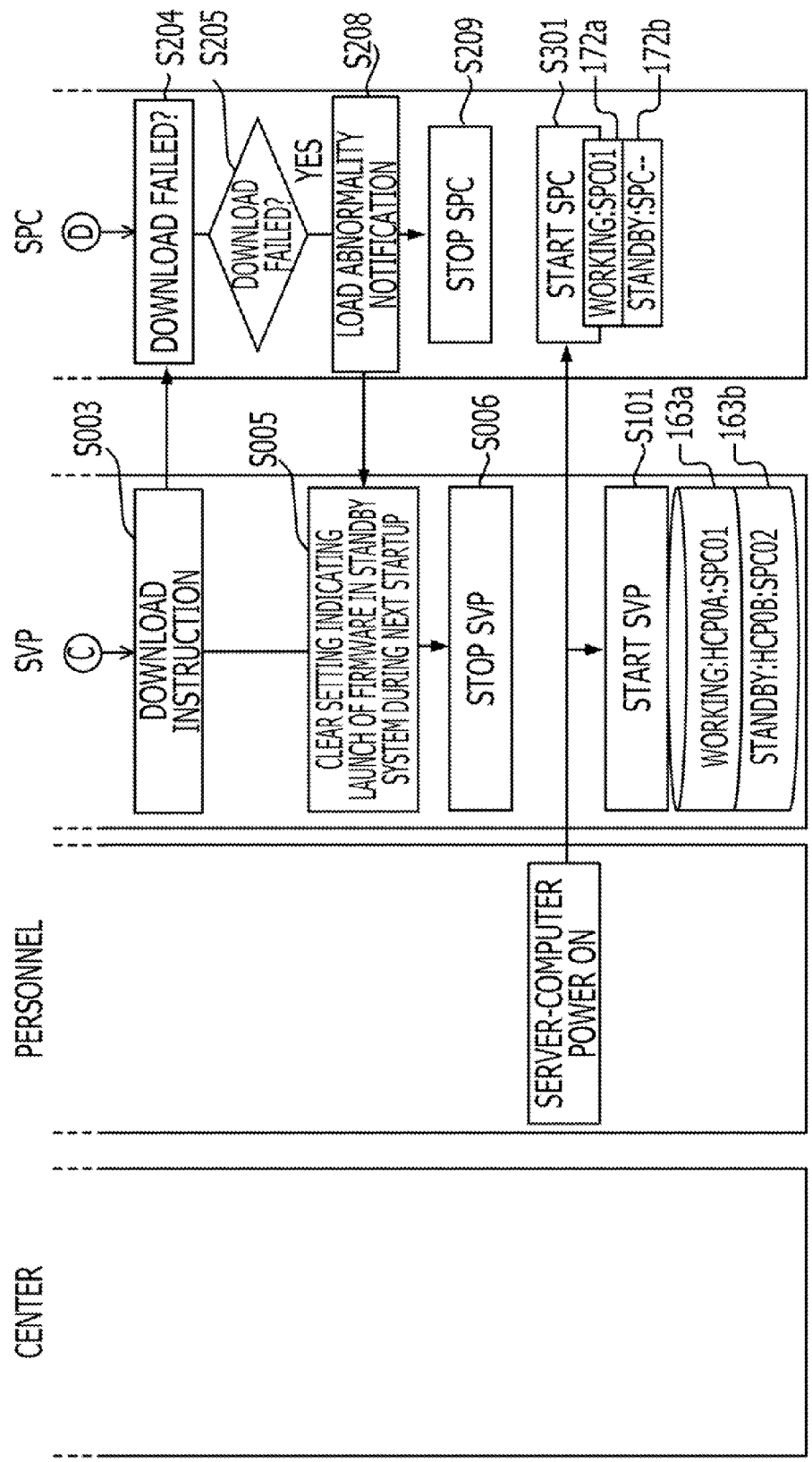

Thereafter, when the maintenance personnel input a command to turn on the power of the server computer 1, the CPU 171 in the SPC 17 switches between the storage area 172b set as the standby system and the storage area 172a set as the working system in accordance with the setting indicating that the storage area 172b currently set as the standby system is to be switched to the working system to launch the firmware, as illustrated in FIG. 10. The CPU 171 in the SPC 17 then launches the new version of the firmware in the storage area 172b newly switched to the working system. In accordance with the setting, the CPU 161 in the SVP 16 whose main power is turned on by the PSU 182 under the control of the SPC 17 switches between the HCP storage area 163b set as the standby system and the HCP storage area 163a set as the working system. The CPU 161 in the SVP 16 then launches the new version of the firmware in the HCP storage area 163b newly switched to the working system.

According to the present embodiment as described above, after the HCP is downloaded, the SVP firmware and the SPC firmware are updated by simply turning off and on the power of the server computer 1 once, as long as no error occurs. Accordingly, inconvenience resulting from a difference between the version numbers of the firmware does not occur.

Figure 12:
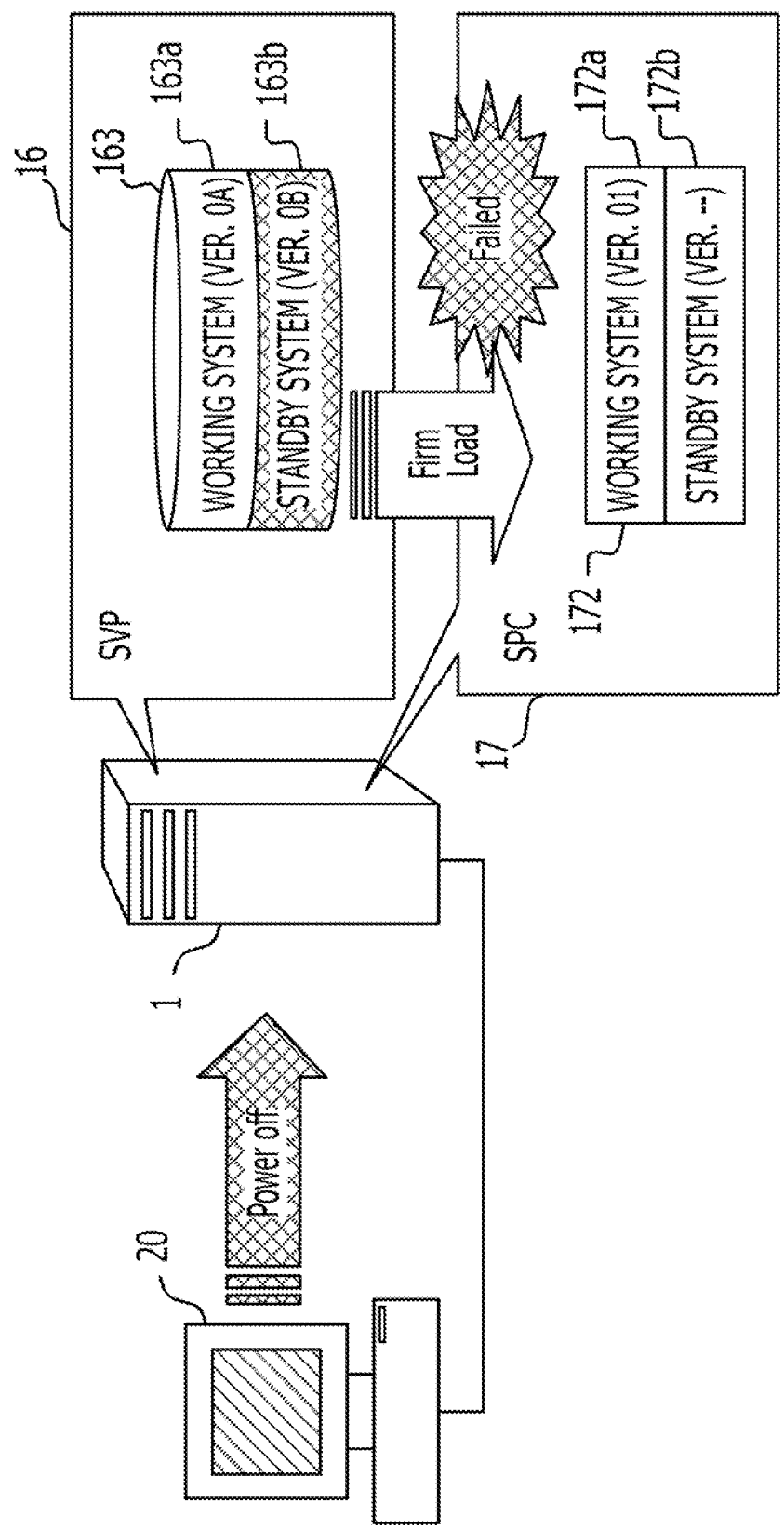
FIG. 12 is a schematic diagram illustrating the second operation example.

FIGS. 11A and 11B to 13 illustrate an example of a case in which the SPC-firmware download performed by the CPU 171 in the SPC 17 fails (in step S204). In this case, the CPU 171 in the SPC 17 attempts to download, in the standby-system storage area 172b in the memory 172, the SPC firmware in the new version of the HCP stored in the standby-system HCP storage area 163b in the SVP 16 (step S204). As illustrated in FIG. 12, when the download fails (step S205), the CPU 171 in the SPC 17 issues a download abnormality notification to the SVP 16 (in step S208).

Upon receiving the download abnormality notification, the CPU 161 in the SVP 16 clears the setting for the switching reservation processing (step S005).

Subsequently, the power of the server computer 1 is turned on. In this case, as illustrated in FIG. 13, the CPU 171 in the SPC 17 does not have the setting indicating the switching between the HCP storage area 163a set as the working system and the HCP storage area 163b set as the standby system. Thus, the CPU 171 in the SPC 17 launches the firmware in the storage area 172a previously set as the working system, without switching between the storage area 172a set as the working system and the storage area 172b set as the standby system. Since the CPU 161 in the SVP 16 to which main power is supplied by the PSU 182 under the control of the SPC 17 also does not have the setting indicating the switching between the standby system and the working system, the CPU 161 does not switch between the HCP storage area 163a set as the working system and the HCP storage area 163b set as the standby system. The CPU 161 in the SVP 16 launches the firmware stored in the working-system HCP storage area 163a before the setting was performed.

As described above, according to the present embodiment, when the SPC 17 fails in the download of the firmware, the setting based on the switching reservation command is cleared. Thus, the firmware in the SPC 17 is not updated and the firmware in the SVP 16 is not updated as well. Accordingly, inconvenience resulting from a difference between the version numbers of the firmware does not occur.

Figure 15:
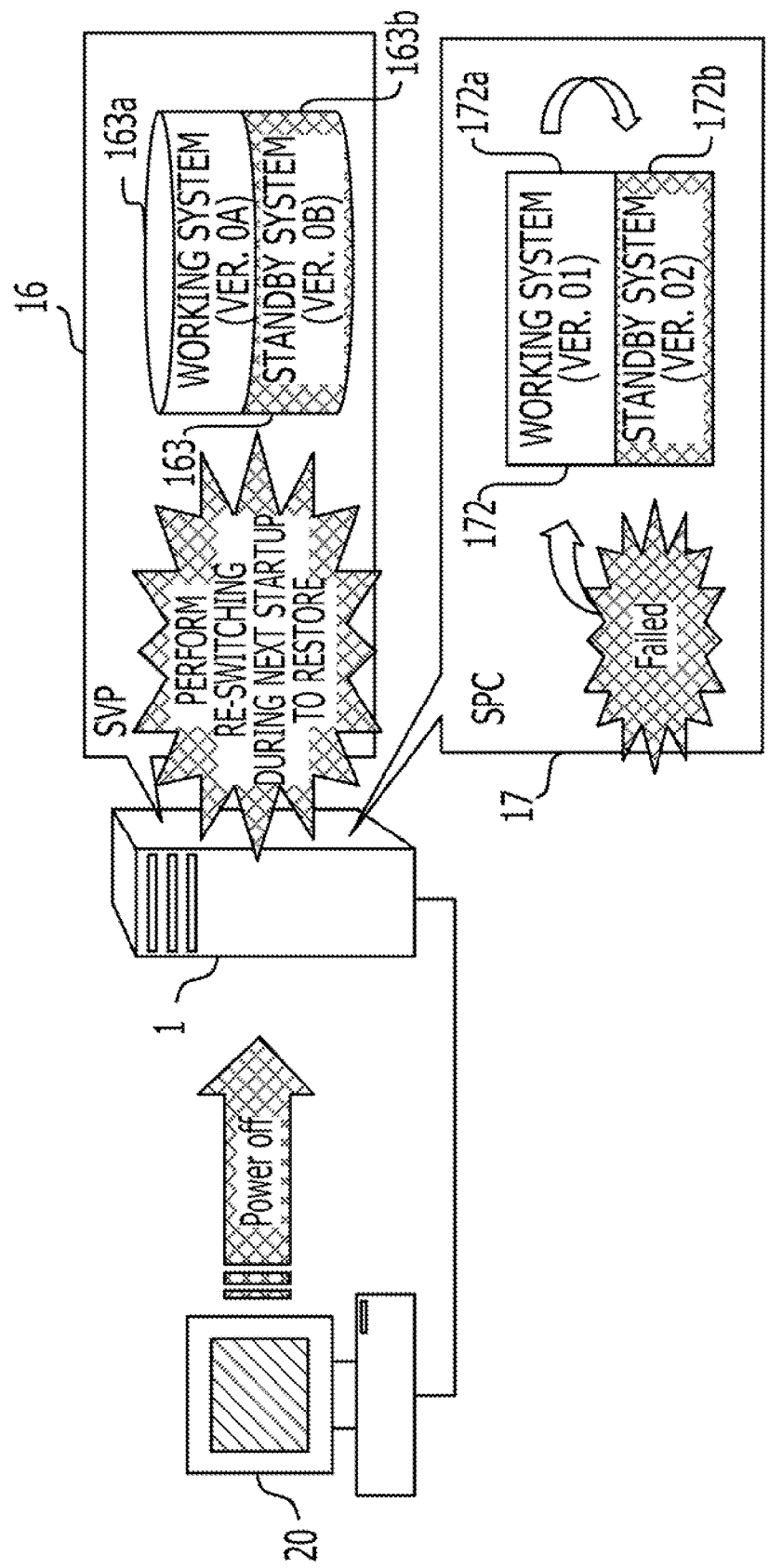
FIG. 15 is a schematic diagram illustrating the third operation example.

FIGS. 14A, 14B, and 15 illustrate an example of a case in which, when the power is turned on after the CPU 171 in the SPC 17 completes the download, the CPU 171 in the SPC 17 fails in the switching between the storage area 172b set as the standby system and the storage area 172a set as the working system (step S302). In this case, when the power of the server computer 1 is turned on after a procedure that is analogous to the procedure in the first operation example described above is performed, the CPU 171 in the SPC 17 attempts to switch between the storage area 172b set as the standby system and the storage area 172a set as the working system (step S301). As illustrated in FIG. 15, when the switching between the storage area 172b set as the standby system and the storage area 172a set as the working system fails (step S302), the CPU 171 in the SPC 17 issues a switching abnormality notification to the SVP 16 (step S303).

In accordance with the setting, the CPU 161 in the SVP 16 to which main power is supplied by the PSU 182 under the control of the SPC 17 switches between the HCP storage area 163b set as the standby system and the HCP storage area 163a set as the working system. The CPU 161 in the SVP 16 launches the new version of the firmware in the HCP storage area 163b newly switched to the working system. However, since the CPU 161 in the SVP 16 receives the switching abnormality notification from the SPC 17 after the startup, the CPU 161 performs a setting, described below, on the next-time startup version-number area in the header section 163x on the hard disk 163 (step S105). That is, the CPU 161 performs a setting so that the HCP storage area 163a currently set as the standby system and the HCP storage area 163b currently set as the working system are respectively switched to the working system and the standby system during next startup and the firmware in the HCP storage area 163a newly switched to the working system is launched. Thereafter, the CPU 161 resets itself in accordance with the setting indicating that the HCP storage area 163a currently set as the standby system is to be switched to the working system to launch the firmware (step S106). As a result, in accordance with the setting, the CPU 161 switches the HCP storage area 163a currently set as the standby system to the working system, and the CPU 161 switches the HCP storage area 163b currently set as the working system to the standby system to launch the firmware in the HCP storage area 163a newly switched to the working system.

As a result of the above-described processing, the firmware executed by the CPU 161 in the SVP 16 becomes the old version of the firmware, so that the version number of the firmware matches the version number of the firmware in the SPC 17 in which the switching between the storage area 172b set as the standby system and the version number of the firmware in the storage area 172a set as the working system failed. Accordingly, inconvenience resulting from a difference between the version numbers of the firmware does not occur.

Figure 16A:
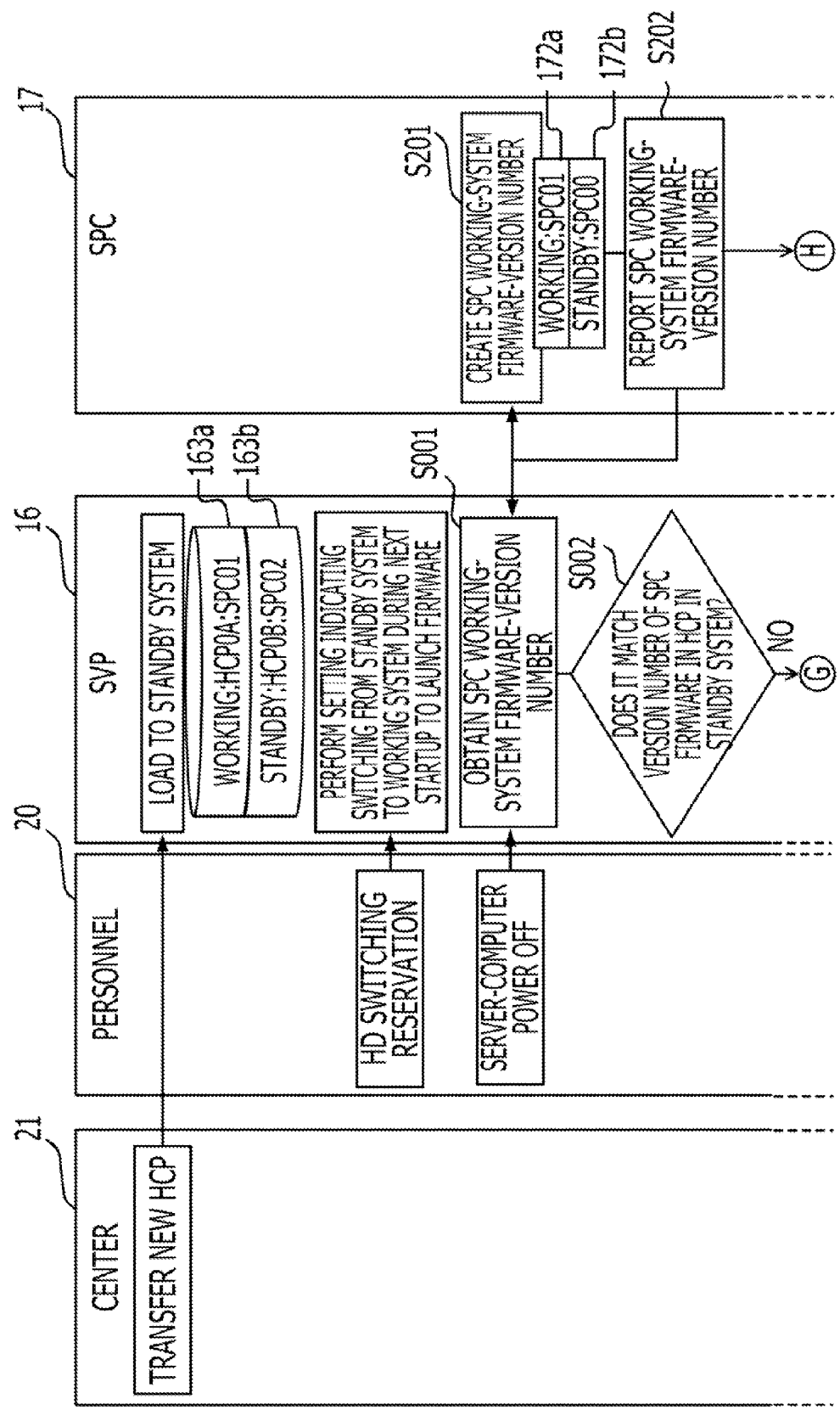
Figure 17:
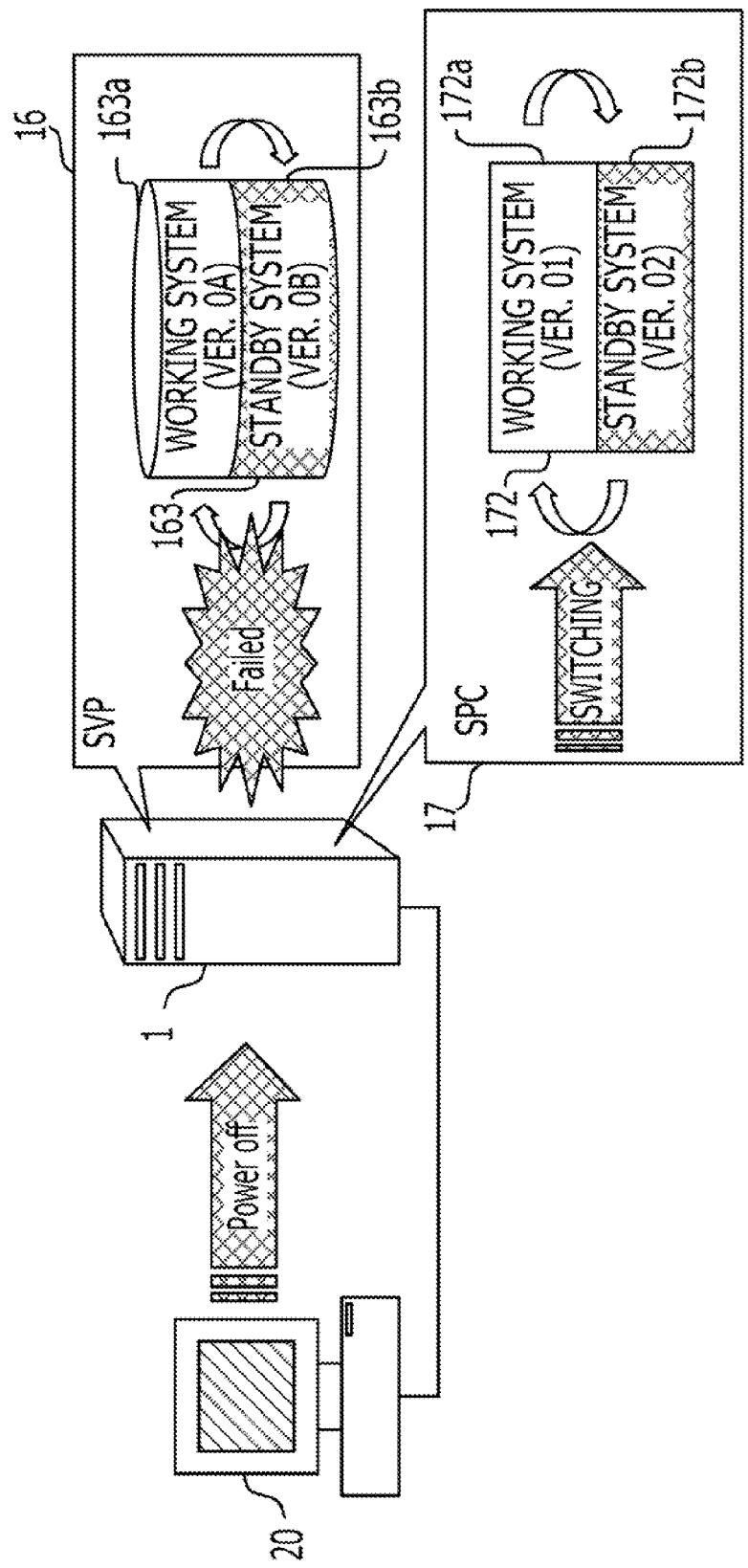
FIG. 17 is a schematic diagram illustrating the fourth operation example.

FIGS. 16A, 16B, and 17 illustrate an example of a case in which, when the power is turned on after the download performed by the CPU 171 in the SPC 17 is completed, the CPU 161 in the SVP 16 fails in the switching between the HCP storage area 163b set as the standby system and the HCP storage area 163a set as the working system (step S102). In this case, when the main power is supplied to the SVP 16 after a procedure that is analogous to the procedure in the first operation example described above is performed, the CPU 161 in the SVP 16 attempts to switch between the HCP storage area 163b set as the standby system and the HCP storage area 163a set as the working system (step S101). As illustrated in FIG. 17, when the switching between the HCP storage area 163b set as the standby system and the HCP storage area 163a set as the working system fails (step S102), the CPU 161 in the SVP 16 issues a switching abnormality notification to the SPC 17 (step S103).

On the other hand, the CPU 171 in the SPC 17 switches between the storage area 172b set as the standby system and the storage area 172a set as the working system in accordance with the setting and launches the new version of the firmware in the storage area 172b newly switched to the working system. However, since the CPU 171 in the SPC 17 receives the switching abnormality notification from the SVP 16 after the startup, the CPU 171 performs setting described below on the non-volatile memory in the CPU 171 (step S305). That is, the CPU 171 performs setting so that the storage area 172a currently set as the standby system and the storage area 172b currently set as the working system are respectively switched to the working system and the standby system during next startup and the firmware in the storage area 172a newly switched to the working system is launched. Thereafter, the CPU 171 resets itself in accordance with the setting indicating that the storage area 172a currently set as the standby system is to be switched to the working system to launch the firmware (step S306). As a result, in accordance with the setting, the CPU 171 switches the storage area 172a currently set as the standby system to the working system, then the CPU 171 switches the storage area 172b currently set as the working system to the standby system, and the CPU 171 launches the firmware in the storage area 172a newly switched to the working system.

As a result of the above-described processing, the firmware executed by the CPU 171 in the SPC 17 becomes the old version of the firmware, so that the version number of the firmware matches the version number of the firmware in the SVP 16 in which the switching failed, as described above. Accordingly, inconvenience resulting from a difference between the version numbers of the firmware does not occur.

Figure 18B:
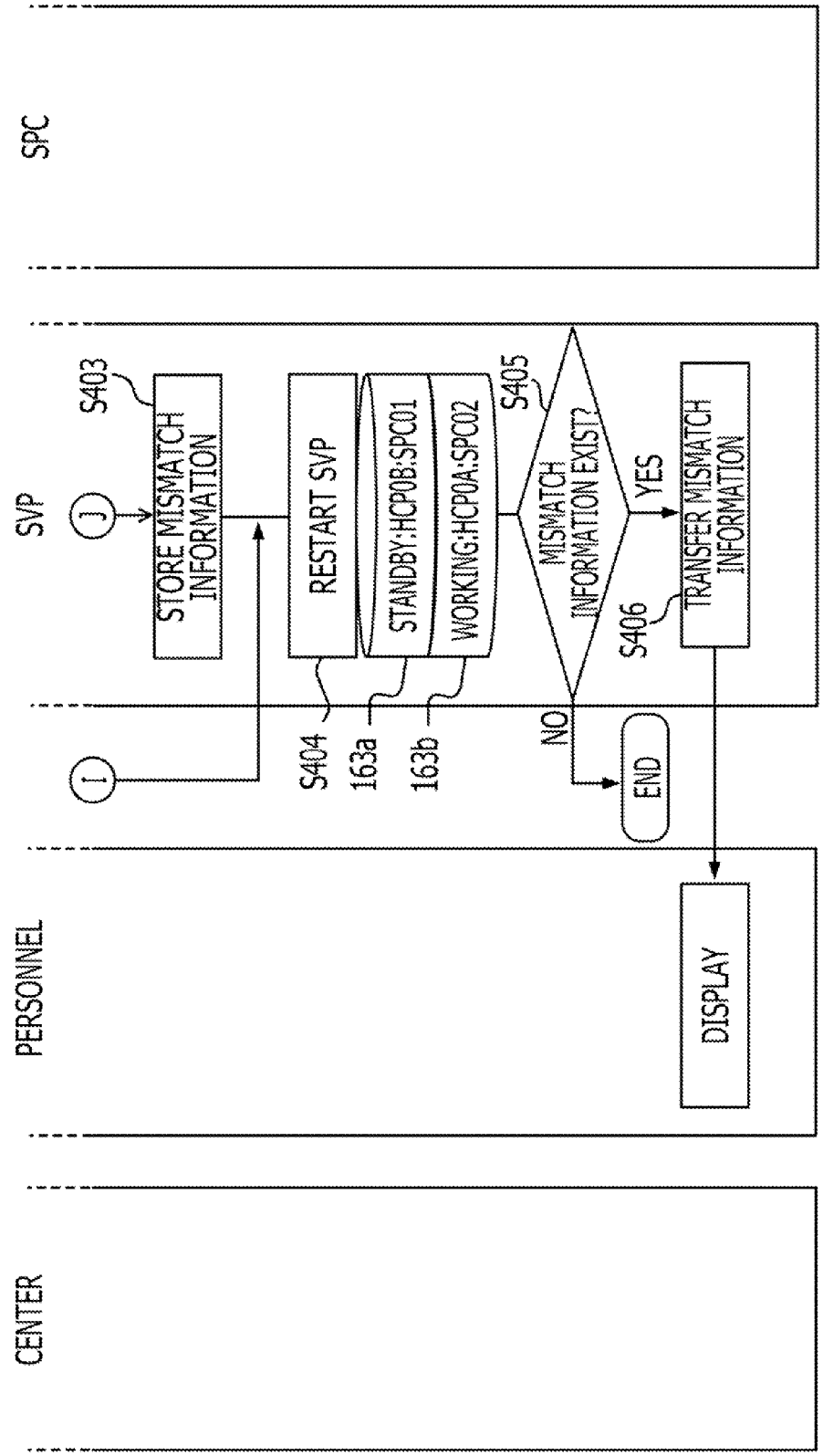
Figure 19:
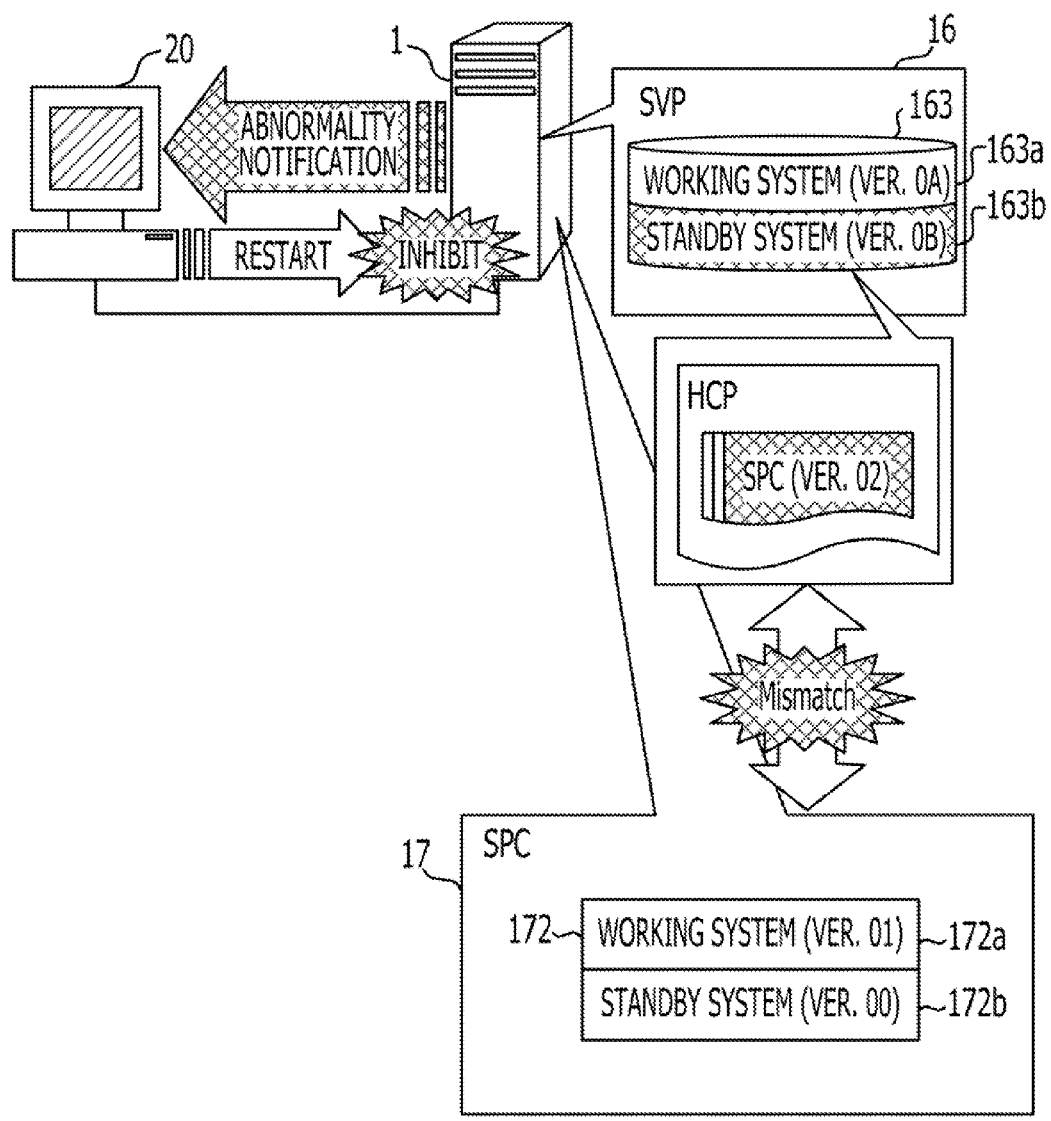
FIG. 19 is a schematic diagram illustrating the modification.
Figure 20A:
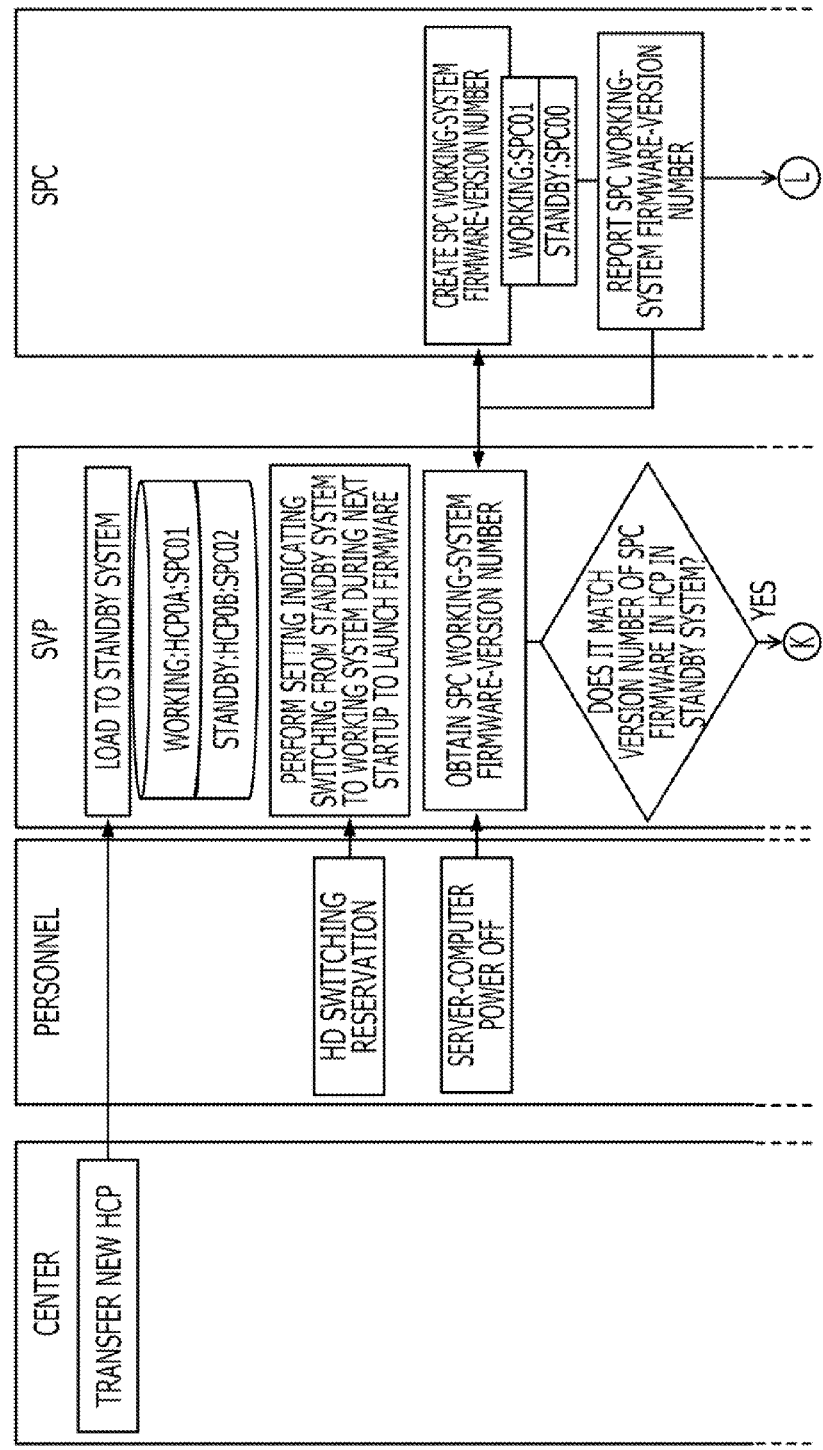
FIGS. 20A and 20B are a flow diagram illustrating an example of related art.
Figure 20B:
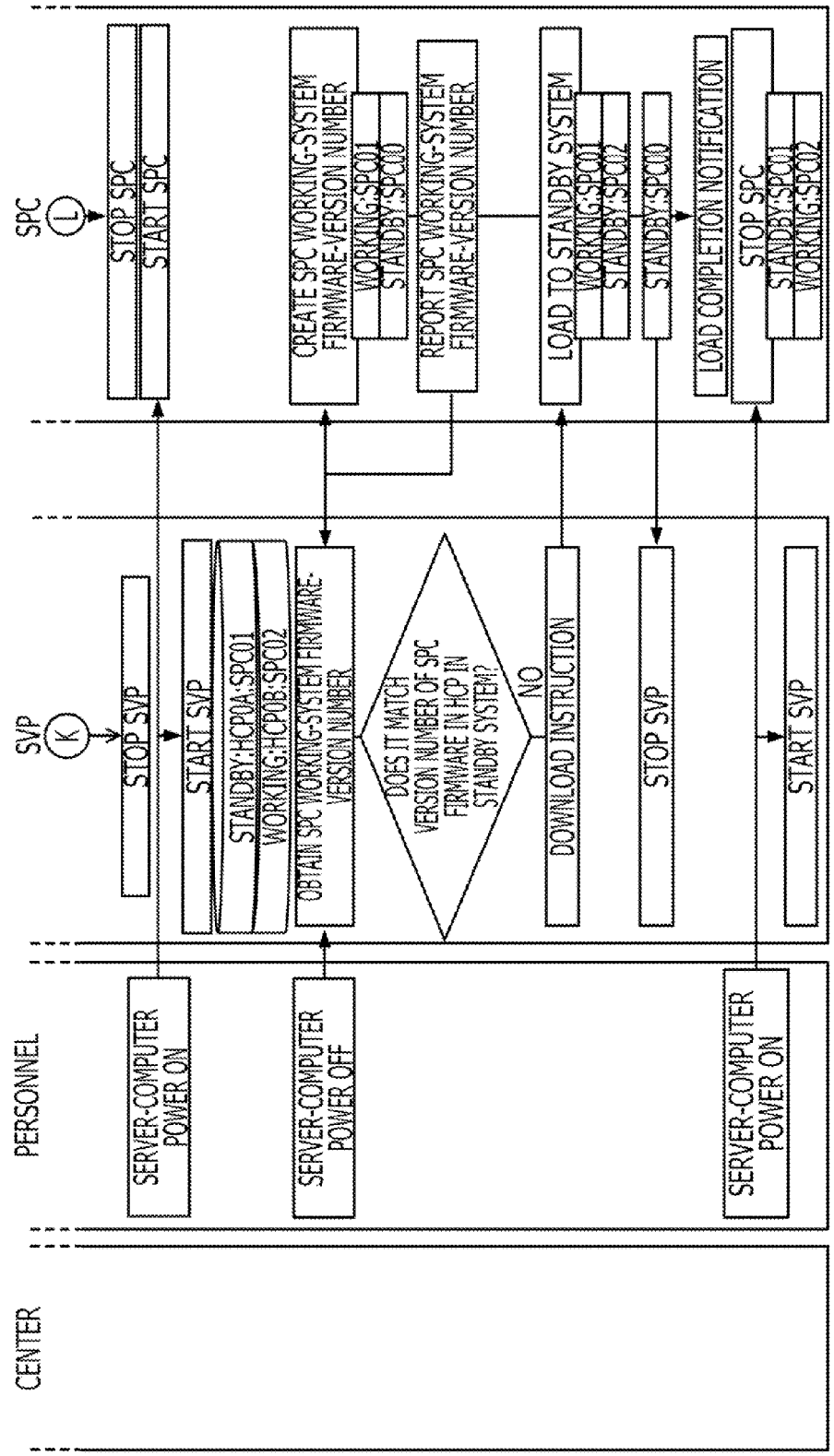
Figure 21A:
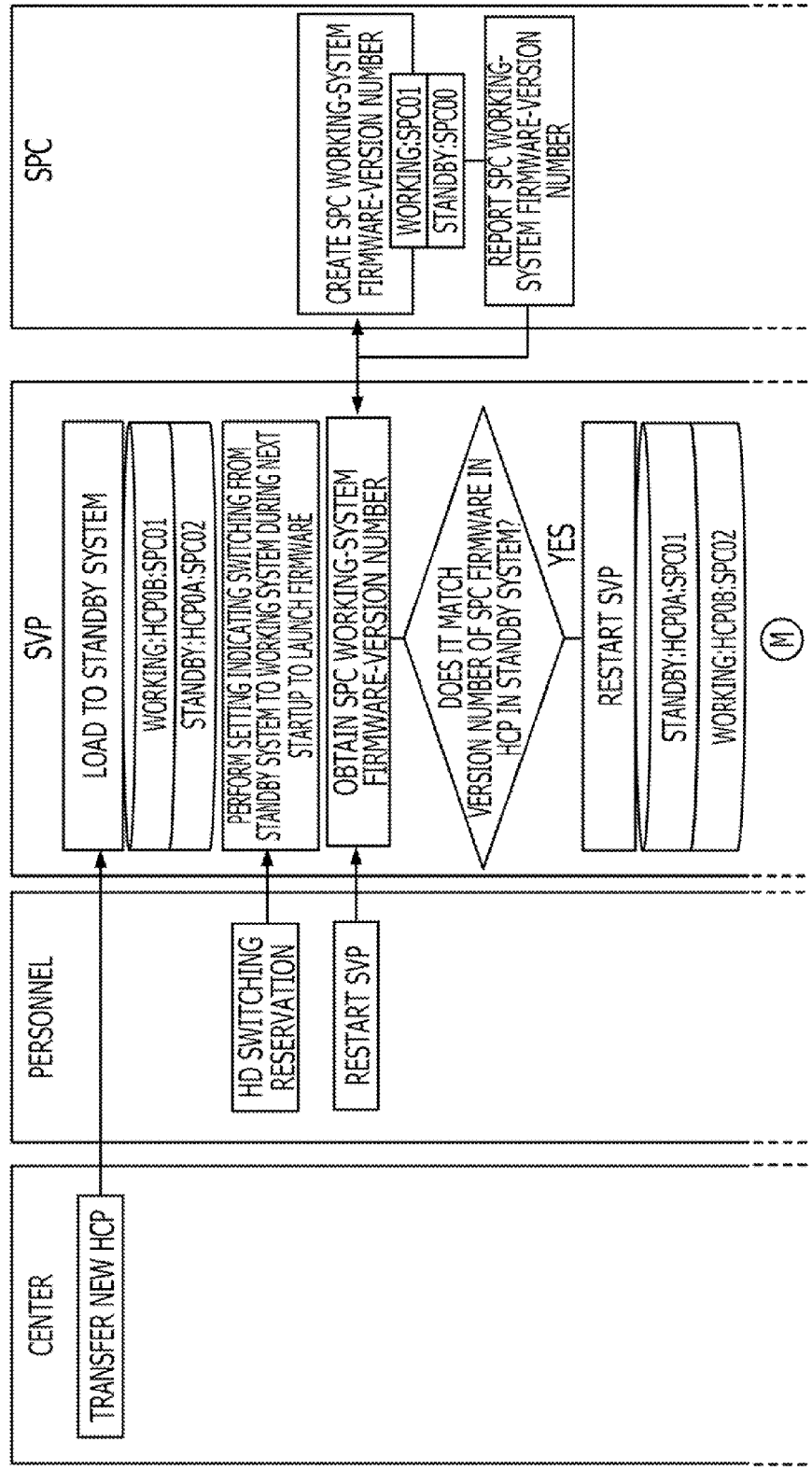
FIGS. 21A and 21B are a flow diagram illustrating an example of related art.
Figure 21B:
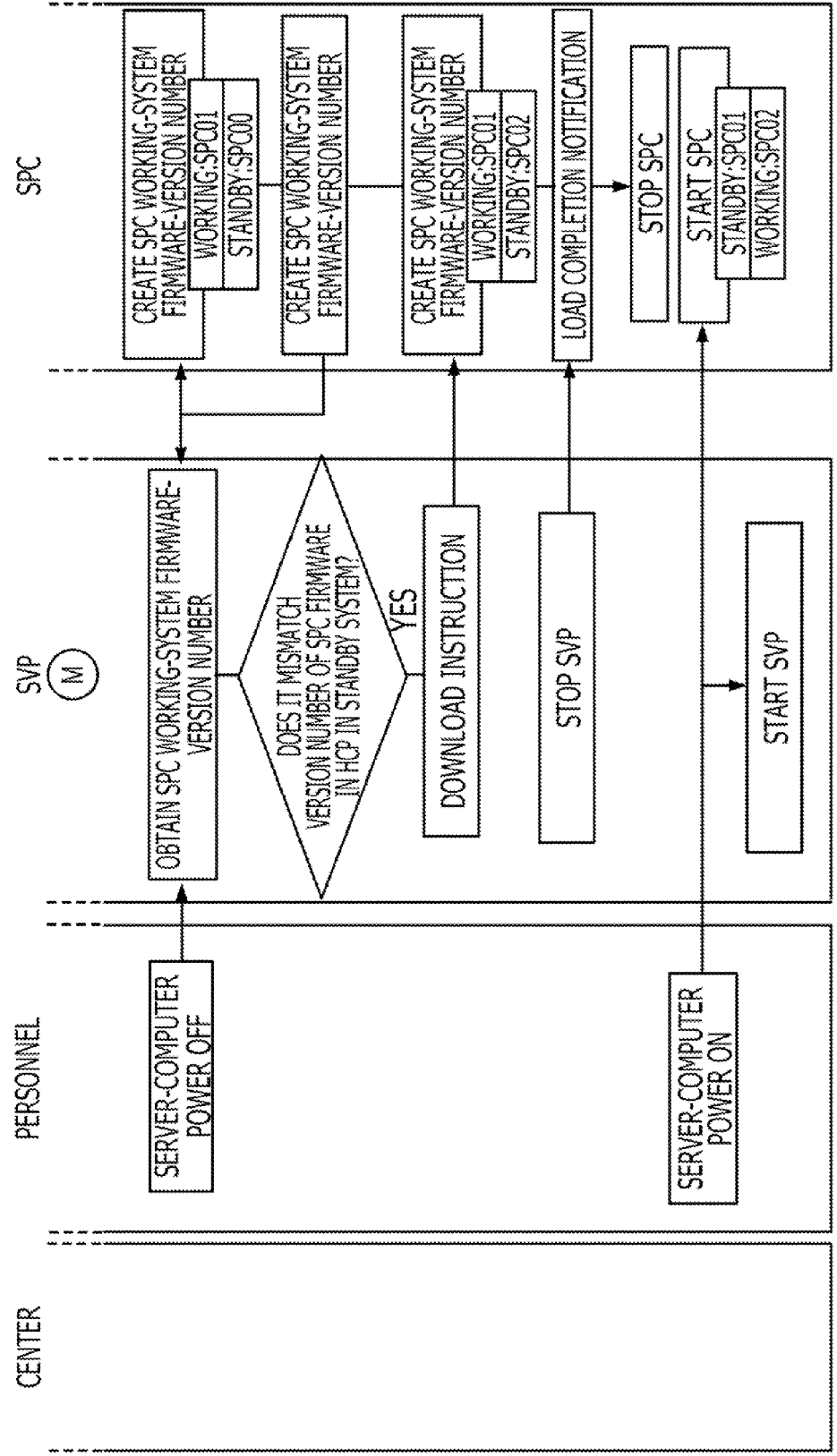

FIGS. 18A, 18B, and 19 illustrate a modification in which, when the maintenance personnel input an SVP restart command (a reset command) from the input device (not illustrated) for the console 20 instead of a command for turning off the power of the server computer 1. When the SVP restart command (the reset command) is input, the firmware update in the SVP 16 is possible but the firmware update in the SPC 17 is not executed in conjunction therewith and thus needs to be performed independently. Accordingly, in this example, after the firmware update in the SVP 16 is completed, it is displayed on the console 20 that mismatch information indicating that the version number of the firmware in the SPC 17 does not match the firmware in the SVP 16.

That is, when the maintenance personnel input the SVP restart command (the reset command) from the input device (not illustrated) for the console 20 in step S401, the CPU 161 queries the SPC 17 about the working-system firmware-version number. The "working-system firmware-version number" in this case refers to the version number of the firmware installed in the storage area 172a set as the working system at the time of current processing. When the SPC 17 reports the working-system firmware-version number in response to the query (this operation of the SPC 17 corresponds to a function of a reporting unit), the CPU 161 advances the process to step S402.

In step S402, the CPU 161 compares the version number of the SPC firmware included in the HCP stored in the HCP storage area 163b currently set as the standby system with the working-system firmware-version number obtained in step S401 (this operation of the CPU 161 corresponds to a function of a comparing unit). The CPU 161 then checks whether both of the version numbers match each other.

When both of the version numbers match each other, the matching means that the new version of the firmware is already downloaded to the SPC 17. In this case, the CPU 161 advances the process to step S404. On the other hand, when both of the version numbers do no match each other, only an old version of the firmware exists in the SPC 17. Thus, in step S403, the CPU 161 stores the mismatch information in the header section 163x (this operation corresponds to a function of a storing unit). Subsequently, the CPU 161 advances the process to step S404.

In step S404, the CPU 161 resets itself in accordance with the setting based on the switching reservation command. That is, the CPU 161 switches the HCP storage area 163b currently set as the standby system to the working system and switches the HCP storage area 163a currently set as the working system to the standby system to launch the firmware in the HCP storage area 163b newly switched to the working system in accordance with the setting (this operation of the CPU 161 corresponds to a function of the launching unit).

Next, in step S405, the CPU 161 checks whether the mismatch information exists in the next-time startup version-number area in the header section 163x on the hard disk 163.

When the mismatch information does not exist, the CPU 161 ends the processing. When the mismatch information exists, the CPU 161 transfers the mismatch information to the console 20 so as to display the mismatch information on a display of the console 20 (this operation of the CPU 161 corresponds to a function of a warning unit).

With this arrangement according to the modification, on the basis of the mismatch information displayed on the display of the console 20, the maintenance personnel can notice that the version number of the firmware in the SPC 17 is older than the version number of the firmware in the SVP 16. Accordingly, the maintenance personnel can update the firmware in the SPC 17 independently.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus comprising:
a first processor that executes a first firmware;
a second processor that executes a second firmware; and
a power-supply device that turns on and off power of the information processing apparatus in accordance with an inputted instruction;
wherein the first processor includes
a first storage unit that has a first area set as a working system and a second area set as a standby system, the first firmware and the second firmware being stored in the second area,
a download instructing unit that issues an instruction to the second processor for downloading the second firmware from the second area of the first storage unit when an instruction for turning off the power of the information processing apparatus is received, and
a first launching unit that switches the second area of the first storage unit from the standby system to the working system and that launches the first firmware stored in the second area of the first storage unit switched to the working system when an instruction for turning on the power of the information processing apparatus is received after the instruction for downloading the second firmware is issued to the second processor; and
the second processor includes
a second storage unit that has a first area set as a working system and a second area set as a standby system,
a downloading unit that downloads the second firmware stored in the second area included in the first storage unit set as the standby system of the first storage into the second area included in the second storage unit set as the standby system of the second storage when the instruction for downloading the second firmware is received from the download instructing unit, and
a second launching unit that switches the second area of the second storage unit from the standby system to the working system and that launches the second firmware stored in the second area included in the second storage unit switched to the working system when the instruction for turning on the power of the information processing apparatus is received after the second firmware is downloaded.

2. The information processing apparatus according to claim 1, wherein the first processor is disposed as a service processor for controlling the information processing apparatus and the second processor is disposed as a power-supply control device for controlling the power-supply device.

3. The information processing apparatus according to claim 1, wherein a setting information indicating switching of the second area of the first storage unit is stored in the first storage unit; and the first launching unit switches the second area of the first storage unit from the standby system to the working system in accordance with the setting information and indicates that the second area included in the first storage unit is to be switched from the standby system to the working system next time when the power-supply device turns on the power of the information processing apparatus.

4. The information processing apparatus according to claim 3, wherein the setting information is set in the first storage unit by a switching reservation command inputted to the first processor.

5. The information processing apparatus according to claim 3, wherein the second processor notifies the first processor of a download error when the downloading unit fails in the download of the second firmware; and the first processor notified of the download error cancels the setting information that is stored in the first storage unit.

6. The information processing apparatus according to claim 3, wherein the second processor notifies the first processor of a switching error when the second launching unit fails in the switching of the second area of the second storage unit from the standby system to the working system; and the first processor notified of the switching error stores the setting information in the first storage unit and is then restarted.

7. The information processing apparatus according to claim 1, wherein the download instructing unit queries the second processor about a version number of the second firmware stored in the first area included in the second storage unit and set as the working system when the instruction for turning off the power of the information processing apparatus is received, the download instructing unit compares the second-firmware version number reported by the second processor with a version number of the second firmware stored in the second area of the first storage unit when the second processor reports the version number of the second firmware stored in the first area included in the second storage unit and set as the working system, and the download instructing unit issues an instruction for downloading the second firmware to the second processor when the second-firmware version number reported by the second processor does not match the version number of the second firmware stored in the second area of the first storage unit.

8. The information processing apparatus according to claim 1, wherein the power-supply device turns on and off the power of the information processing apparatus by supplying and not supplying a main power to the individual devices that comprise the information processing apparatus.

9. A firmware updating method for an information processing apparatus including a first processor that has a first storage unit having a first area set as a working system and a second area set as a standby system, a first firmware and a second firmware being stored in the second area, and that executes the first firmware, a second processor that has a second storage unit having a first area set as a working system and a second area set as a standby system and that executes the second firmware, and a power-supply device that turns on and off power of the information processing apparatus in accordance with an inputted instruction, the firmware updating method comprising:

issuing an instruction for downloading the second firmware from the second area of the first storage unit to the second processor when an instruction for turning off the power of the information processing apparatus is received;

downloading the second firmware stored in the second area included in the first storage unit and set as the standby system of the first storage into the second area included in the second storage unit set as the standby system of the second storage when the instruction for downloading the second firmware is received;

switching the second area of the first storage unit from the standby system to the working system and launching the first firmware stored in the second area included in the first storage unit switched to the working system when an instruction for turning on the power of the information processing apparatus is received after the instruction for downloading the second firmware is issued to the second processor; and switching the second area of the second storage unit from the standby system to the working system and launching the second firmware stored in the second area included in the second storage unit switched to the working system when the instruction for turning on the power of the information processing apparatus is received after the second firmware is downloaded.

10. The firmware updating method according to claim 9, wherein the first processor is disposed as a service processor for controlling the information processing apparatus and the second processor is disposed as a power-supply control device for controlling the power-supply device.

11. The firmware updating method according to claim 9, wherein a setting information indicating switching of the second area of the first storage unit is stored in the first storage unit; and the second area of the first storage unit is switched from the standby system to the working system to launch the first firmware in accordance with the setting information and indicates that the second area included in the first storage unit is to be switched from the standby system to the working system next time when the power-supply device turns on the power of the information processing apparatus.

12. The firmware updating method according to claim 11, wherein the setting information is set in the first storage unit by a switching reservation command inputted to the first processor.

13. The firmware updating method according to claim 11, wherein the second processor notifies the first processor of a download error when the downloading of the second firmware fails; and the first processor notified of the download error cancels the setting information that is stored in the first storage unit.

14. The firmware updating method according to claim 11, wherein the second processor notifies the first processor of a switching error when the switching of the second area of the second storage unit from the standby system to the working system fails during the launch of the second firmware; and the first processor notified of the switching error stores the setting information in the first storage unit and is then restarted.

15. The firmware updating method according to claim 9, wherein the second processor is queried about a version number of the second firmware stored in the first area included in the second storage unit and set as the working system in the downloading of the second firmware when the instruction for turning off the power of the information processing apparatus is received, the second-firmware version number reported by the second processor is compared with a version number of the second firmware stored in the second area of the first storage unit when the second processor reports the version number of the second firmware stored in the first area included in the second storage unit and set as the working system, and an instruction for downloading the second firmware is issued to the second processor when the second-firmware version number reported by the second processor does not match the version number of the second firmware stored in the second area of the first storage unit.

16. The firmware updating method according to claim 9, wherein the power-supply device turns on and off the power of the information processing apparatus by supplying and not supplying a main power to the individual devices that comprise the information processing apparatus.

* * * * *